United States Patent
Hayden et al.

(10) Patent No.: US 9,723,067 B2
(45) Date of Patent: *Aug. 1, 2017

(54) PRIORITIZED CONTENT TRANSMISSION

(71) Applicant: Amazon Technologies, Inc., Seattle, WA (US)

(72) Inventors: Andrew Lynch Hayden, Seattle, WA (US); Peter F. Hill, Seattle, WA (US); Matthew L. Trahan, Seattle, WA (US); Samuel J. Young, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,817

(22) Filed: Feb. 19, 2016

(65) Prior Publication Data

US 2016/0173576 A1    Jun. 16, 2016

Related U.S. Application Data

(63) Continuation of application No. 13/433,234, filed on Mar. 28, 2012, now Pat. No. 9,307,004.

(51) Int. Cl.
*G06F 15/16* (2006.01)
*H04L 29/08* (2006.01)
(Continued)

(52) U.S. Cl.
CPC ............. *H04L 67/10* (2013.01); *H04L 43/08* (2013.01); *H04L 67/02* (2013.01);
(Continued)

(58) Field of Classification Search
CPC ......... H04L 67/10; H04L 67/02; H04L 67/42; H04L 67/322; H04L 43/08; H04L 67/2838; H04L 67/2842
See application file for complete search history.

(56) References Cited

U.S. PATENT DOCUMENTS 5,634,064 A    5/1997 Warnock et al.
5,872,850 A    2/1999 Klein et al.
(Continued)

FOREIGN PATENT DOCUMENTS

WO    WO 2013/003631 A2    1/2013

OTHER PUBLICATIONS

Bango, R., How JS & Ajax work in Opera Mini 4, Nov. 2, 2007, XP055050107, Retrieved from the Internet.
(Continued)

*Primary Examiner* — Cheikh Ndiaye
(74) *Attorney, Agent, or Firm* — Knobbe, Martens, Olson & Bear, LLP

(57) ABSTRACT

Features are provided for facilitating prioritized transmission of content between content providers and content requesters. A content provider or intermediary entity obtains prioritization rules for transmitting network resources, such as resources embedded in or otherwise associated with web pages. The prioritization rules can be general rules applying to the transmission of all network resources or a large number thereof, or they can be customized for a specific network resource or small group thereof. The prioritization rules can be applied to the relative bandwidth utilization or data transfer rates of network resources. The relative bandwidth utilization or data transfer rates can be adjusted in response to network or user events.

20 Claims, 16 Drawing Sheets

(51) Int. Cl.
*H04L 12/26* (2006.01)
*H04L 29/06* (2006.01)

(52) U.S. Cl.
CPC ...... *H04L 67/2838* (2013.01); *H04L 67/2842* (2013.01); *H04L 67/322* (2013.01); *H04L 67/42* (2013.01)

(56) References Cited

U.S. PATENT DOCUMENTS

| | | |
|---|---|---|
| 5,961,593 A | 10/1999 | Gabber et al. |
| 6,049,812 A | 4/2000 | Bertram et al. |
| 6,108,637 A | 8/2000 | Blumenau |
| 6,138,156 A | 10/2000 | Fletcher et al. |
| 6,195,679 B1 | 2/2001 | Bauersfeld et al. |
| 6,430,624 B1 | 8/2002 | Jamtgaard et al. |
| 6,549,941 B1 | 4/2003 | Jaquith et al. |
| 6,560,620 B1 | 5/2003 | Ching |
| 6,625,624 B1 | 9/2003 | Chen et al. |
| 6,704,024 B2 | 3/2004 | Robotham et al. |
| 6,785,864 B1 | 8/2004 | Te et al. |
| 6,871,236 B2 | 3/2005 | Fishman et al. |
| 6,944,665 B2 | 9/2005 | Brown et al. |
| 6,963,850 B1 | 11/2005 | Bezos et al. |
| 7,003,442 B1 | 2/2006 | Tsuda |
| 7,051,084 B1 | 5/2006 | Hayton et al. |
| 7,054,952 B1 | 5/2006 | Schwerdtfeger et al. |
| 7,085,736 B2 | 8/2006 | Keezer et al. |
| 7,117,504 B2 * | 10/2006 | Smith ............. G06F 8/20 709/201 |
| 7,159,023 B2 | 1/2007 | Tufts |
| 7,171,478 B2 | 1/2007 | Lueckhoff et al. |
| 7,191,211 B2 | 3/2007 | Tuli |
| 7,353,252 B1 | 4/2008 | Yang et al. |
| 7,373,313 B1 | 5/2008 | Kahle et al. |
| 7,543,059 B2 | 6/2009 | Johnson et al. |
| 7,792,944 B2 | 9/2010 | Desantis et al. |
| 7,831,582 B1 | 11/2010 | Scofield et al. |
| 7,975,000 B2 | 7/2011 | Dixon et al. |
| 7,996,912 B2 | 8/2011 | Spalink et al. |
| 8,010,545 B2 | 8/2011 | Stefik et al. |
| 8,015,496 B1 | 9/2011 | Rogers |
| 8,060,463 B1 | 11/2011 | Spiegel |
| 8,073,850 B1 | 12/2011 | Hubbard et al. |
| 8,103,742 B1 | 1/2012 | Green |
| 8,185,621 B2 | 5/2012 | Kasha |
| 8,190,682 B2 | 5/2012 | Paterson-Jones et al. |
| 8,249,904 B1 | 8/2012 | DeSantis et al. |
| 8,271,887 B2 | 9/2012 | Offer et al. |
| 8,316,124 B1 | 11/2012 | Baumback et al. |
| 8,336,049 B2 | 12/2012 | Medovich |
| 8,788,612 B1 * | 7/2014 | Levesque ............. H04L 67/02 709/217 |
| 9,307,004 B1 | 4/2016 | Hayden et al. |
| 2001/0039490 A1 | 11/2001 | Verbitsky et al. |
| 2002/0030703 A1 | 3/2002 | Robertson et al. |
| 2002/0194302 A1 | 12/2002 | Blumberg |
| 2003/0023712 A1 | 1/2003 | Zhao et al. |
| 2003/0041106 A1 | 2/2003 | Tuli |
| 2004/0083294 A1 | 4/2004 | Lewis |
| 2004/0139208 A1 | 7/2004 | Tuli |
| 2004/0181613 A1 | 9/2004 | Hashimoto et al. |
| 2004/0205448 A1 | 10/2004 | Grefenstette et al. |
| 2004/0220905 A1 | 11/2004 | Chen et al. |
| 2004/0243622 A1 | 12/2004 | Morisawa |
| 2005/0010863 A1 | 1/2005 | Zernik |
| 2005/0027815 A1 | 2/2005 | Christodoulou et al. |
| 2005/0060643 A1 | 3/2005 | Glass et al. |
| 2005/0138382 A1 | 6/2005 | Hougaard et al. |
| 2005/0183039 A1 | 8/2005 | Revis |
| 2005/0246193 A1 | 11/2005 | Roever et al. |
| 2006/0085766 A1 | 4/2006 | Dominowska et al. |
| 2006/0095336 A1 | 5/2006 | Heckerman et al. |
| 2006/0122889 A1 | 6/2006 | Burdick et al. |
| 2006/0168510 A1 | 7/2006 | Bryar et al. |
| 2006/0184421 A1 | 8/2006 | Lipsky et al. |
| 2006/0248442 A1 | 11/2006 | Rosenstein et al. |
| 2006/0277167 A1 | 12/2006 | Gross et al. |
| 2006/0294461 A1 | 12/2006 | Nadamoto et al. |
| 2007/0022072 A1 | 1/2007 | Kao et al. |
| 2007/0027672 A1 | 2/2007 | Decary et al. |
| 2007/0094241 A1 | 4/2007 | Blackwell et al. |
| 2007/0124693 A1 | 5/2007 | Dominowska et al. |
| 2007/0139430 A1 | 6/2007 | Korn et al. |
| 2007/0240160 A1 | 10/2007 | Paterson-Jones et al. |
| 2007/0288589 A1 | 12/2007 | Chen et al. |
| 2008/0028334 A1 | 1/2008 | De Mes |
| 2008/0104502 A1 | 5/2008 | Olston |
| 2008/0183672 A1 | 7/2008 | Canon et al. |
| 2008/0184128 A1 | 7/2008 | Swenson et al. |
| 2008/0320225 A1 | 12/2008 | Panzer et al. |
| 2009/0012969 A1 | 1/2009 | Rail et al. |
| 2009/0013034 A1 | 1/2009 | Cheng et al. |
| 2009/0164924 A1 | 6/2009 | Flake et al. |
| 2009/0204478 A1 | 8/2009 | Kaib et al. |
| 2009/0217199 A1 | 8/2009 | Hara et al. |
| 2009/0248680 A1 | 10/2009 | Kalavade |
| 2009/0254867 A1 | 10/2009 | Farouki et al. |
| 2009/0282021 A1 | 11/2009 | Bennett |
| 2009/0287698 A1 | 11/2009 | Marmaros et al. |
| 2009/0327914 A1 | 12/2009 | Adar et al. |
| 2010/0036740 A1 | 2/2010 | Barashi |
| 2010/0057639 A1 | 3/2010 | Schwarz et al. |
| 2010/0125507 A1 | 5/2010 | Tarantino, III et al. |
| 2010/0131594 A1 | 5/2010 | Kashimoto |
| 2010/0138293 A1 | 6/2010 | Ramer et al. |
| 2010/0218106 A1 | 8/2010 | Chen et al. |
| 2010/0293190 A1 | 11/2010 | Kaiser et al. |
| 2010/0312788 A1 | 12/2010 | Bailey |
| 2010/0318892 A1 | 12/2010 | Teevan et al. |
| 2010/0332513 A1 | 12/2010 | Azar et al. |
| 2011/0022957 A1 | 1/2011 | Lee |
| 2011/0029854 A1 | 2/2011 | Nashi et al. |
| 2011/0055203 A1 | 3/2011 | Gutt et al. |
| 2011/0078140 A1 | 3/2011 | Dube et al. |
| 2011/0078705 A1 | 3/2011 | Maclinovsky et al. |
| 2011/0119661 A1 | 5/2011 | Agrawal et al. |
| 2011/0161849 A1 | 6/2011 | Stallings et al. |
| 2011/0173177 A1 | 7/2011 | Junqueira et al. |
| 2011/0173637 A1 | 7/2011 | Brandwine et al. |
| 2011/0178868 A1 | 7/2011 | Garg et al. |
| 2011/0185025 A1 | 7/2011 | Cherukuri et al. |
| 2011/0191327 A1 | 8/2011 | Lee |
| 2011/0197121 A1 | 8/2011 | Kletter |
| 2011/0246873 A1 | 10/2011 | Tolle et al. |
| 2011/0289074 A1 | 11/2011 | Leban |
| 2011/0296341 A1 | 12/2011 | Koppert |
| 2011/0302510 A1 | 12/2011 | Harrison et al. |
| 2012/0066586 A1 * | 3/2012 | Shemesh ........... G06F 17/30902 715/235 |
| 2012/0072821 A1 | 3/2012 | Bowling |
| 2012/0084644 A1 | 4/2012 | Robert et al. |
| 2012/0096365 A1 | 4/2012 | Wilkinson et al. |
| 2012/0110017 A1 | 5/2012 | Gu et al. |
| 2012/0137201 A1 | 5/2012 | White et al. |
| 2012/0143944 A1 | 6/2012 | Reeves et al. |
| 2012/0144288 A1 | 6/2012 | Caruso et al. |
| 2012/0150844 A1 | 6/2012 | Lindahl et al. |
| 2012/0166922 A1 | 6/2012 | Rolles |
| 2012/0198516 A1 | 8/2012 | Lim |
| 2012/0215834 A1 | 8/2012 | Chen et al. |
| 2012/0215919 A1 | 8/2012 | Labat et al. |
| 2012/0284629 A1 | 11/2012 | Peters et al. |
| 2012/0317295 A1 | 12/2012 | Baird et al. |
| 2012/0331406 A1 | 12/2012 | Baird et al. |
| 2013/0007101 A1 | 1/2013 | Trahan et al. |
| 2013/0007102 A1 | 1/2013 | Trahan et al. |
| 2013/0031461 A1 | 1/2013 | Hou et al. |
| 2013/0080611 A1 | 3/2013 | Li et al. |

OTHER PUBLICATIONS

Baumann, A, et al., Enhancing STEM Classes Using Weave: A Collaborative Web-Based Visualization Environment, Integrated

(56) References Cited

OTHER PUBLICATIONS

Stem Education Conference, Apr. 2, 2011, Ewing, New Jersey, pp. 2A-1-2A-4.

Brinkmann, M, Record and Share your browser history with Hooeey, ghacks.net, Feb. 26, 2008, 6 pages, printed on Jan. 25, 2013.

Chen, H., et al., Bringing Order to the Web: Automatically Categorizing Search Results, Proceedings of the SIGCHI Conference on Human Factors in Computing Systems, Apr. 1-6, 2000, pp. 145-152.

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

Considine, A, The Footprints of Web Feet, The New York Times, Mar. 4, 2011, 3 pages, printed on Jan. 25, 2013.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

EyeBrowse: Record, Visualize and Share your Browser History, Information Aesthetics, Sep. 18, 2009, 2 pages, printed on Jan. 25, 2013.

Feuerstein, Adam, Flyswat Takes Aim, San Francisco Business Times, printed from http://www.bizjournals.com/sanfrancisco/stories/1999/10/25/story2.html?t=printable, Oct. 22, 1999, 2 pages.

Gabber et al., How to Make Personalized Web Browsing Simple, Secure, and Anonymous, Financial Cryptography, 1997, 16 pages.

Gingerich, Jason, Keycorp Making Site Into Portal, KRTBN Knight-Ridder Tribune Business News (South Bend Tribune, Indiana), Oct. 25, 1999, 2 pages.

Hopper, D. Ian, Desktops Now Have Power to Comparison-Shop, Oct. 18, 1999, printed from http://www.cnn.com/Tech/computing/9910/18/r.u.sure/index.html, 3 pages.

Rao, H.C.-H., et al., A Proxy-Based Personal Web Archiving Service, Operating Systems Review, 35(1):61-72, 2001.

RSS Ticker: Add-ons for Firefox, https://addons.mozilla.org/en-US/firefox/addon/rssticker/, 3 pages, printed on Feb. 7, 2013.

Teevan, J., et al., Changing How People View Changes on the Web, 2009, Proceedings of the $22^{nd}$ Annual ACM Symposium on User Interface Software and Technology, New York, 2009, pp. 237-246.

Van Kleek, M, Introducing Eyebrowse—Track and share your web browsing in real time, Haystack Blog, Aug. 28, 2009, 3 pages, printed on Jan. 25, 2013.

What Internet Users Do on a Typical Day, Trend Data (Adults), Pew Internet & American Life Project, printed from http://pewinternet.org/Static-Pages/Trend-Data-(Adults)/Online-Activities-Daily.aspx on Nov. 29, 2012, 4 pages.

* cited by examiner

PRIORITIZED CONTENT TRANSMISSION

CROSS-REFERENCE TO RELATED APPLICATION

This application is a continuation of U.S. patent application Ser. No. 13/433,234, entitled PRIORITIZED CONTENT TRANSMISSION, and filed Mar. 28, 2012, the entirety of which is incorporated by reference herein.

BACKGROUND

Generally described, computing devices and communication networks can be utilized to exchange information. In a common application, a computing device can request content from another computing device via a communication network. For example, a user at a personal computing device can utilize a software browser application, typically referred to as a browser, to request a web page from a server computing device via the Internet. In such embodiments, the user computing device can be referred to as a client computing device and the server computing device can be referred to as a content provider.

With reference to an illustrative example, a requested web page, or original content, may be associated with a number of additional resources, such as images or videos, that are to be displayed with the web page. In one specific embodiment, the additional resources of the web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the web page as well as the data associated with the embedded resources. In some cases, as the client computing device encounters each embedded resource identifier, the client computing device establishes a connection with the content provider for the embedded resource, potentially resulting in multiple active connections, to multiple content providers, at any given time during retrieval of the web page. The content providers often transmit the embedded resources to the client computing device as fast as the connection of the client computing device allows, and each additional connection consumes bandwidth that would otherwise be available to the other connections

BRIEF DESCRIPTION OF THE DRAWINGS

Embodiments of various inventive features will now be described with reference to the following drawings, wherein.

DETAILED DESCRIPTION

Figure 1A:
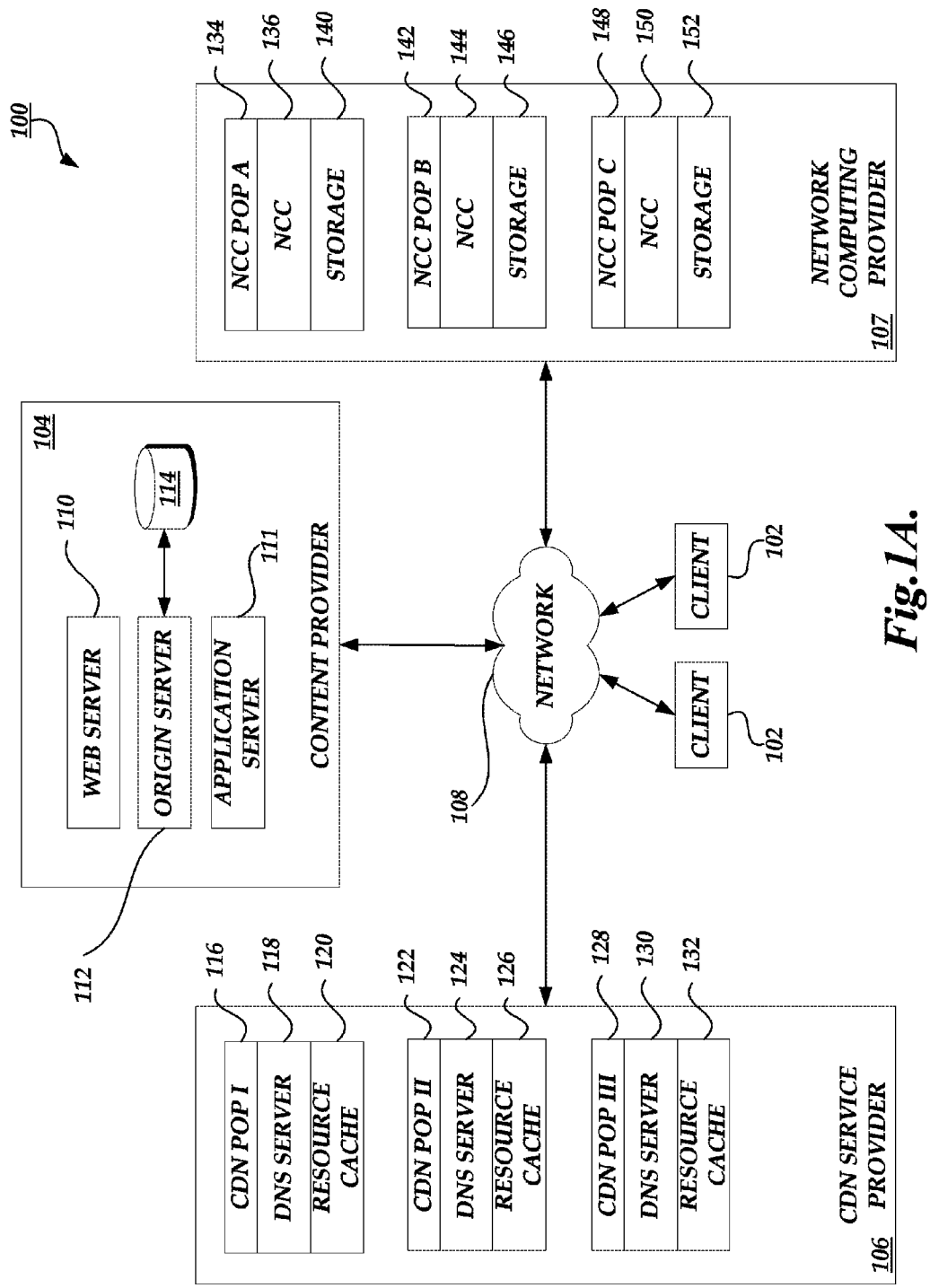
FIG. 1A is a block diagram illustrative of a content delivery environment including a number of client computing devices, content provider, a content delivery network service provider, and a network computing provider.

Generally described, the present disclosure is directed to the prioritized transmission of content between content providers and content requesters. Specifically, aspects of the present disclosure relate to obtaining prioritization rules for transmitting network resources, such as resources embedded in or otherwise associated with web pages. The prioritization rules can be general rules applying to the transmission of all network resources or a large number thereof, or they can be customized for a specific network resource or small group. Additional aspects of the present disclosure relate to application of prioritization rules to the bandwidth utilization or data transfer rates of network resources in response to network or user events. For example, initial relative bandwidth utilization may be specified for each embedded resource. In response to determining that the network connection between the client and the server is slower or faster than expected, relative bandwidth utilization for each embedded resource or some subset thereof can be adjusted.

Although aspects of the embodiments described in the disclosure will focus, for the purpose of illustration, on the transmission of network content in the context of a remote browse session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. Illustratively, the accessed content may include a collection of one or more network resources (e.g., a web page) and embedded resources such as images, video, audio, text, executable code, and other resources. Subsequent to the browser being loaded, a user or automated browser process may cause the client computing device to transmit a request to access content from a content provider by establishing a browse session with a network computing provider across a private or public network. In an illustrative embodiment, responsive to the browse session request received from the client computing device, the network computing provider may instantiate or cause to have instantiated one or more computing components associated with the network computing provider that will host a browser software application. For example, the network computing provider can instantiate, or cause to have instantiated, an instance of a virtual machine that includes a software browser application capable of requesting resources from a communication network. Illustratively, in some situations, one or more devices associated with the network computing provider may be located in a data center or other robustly networked computing environment, and, as compared to the client computing device, may experience relatively little latency or delay when obtaining network resources.

Using the instantiated network computing components, the network computing provider may request, on behalf of the client computing device, network resource(s) from one or more content providers, a content delivery network, or a local or associated cache component. A web page, for example, may include a file containing HTML layout information and references to associated resources or embedded content such as CSS style sheets and JavaScript, as well as embedded content objects such as images, video, audio, etc. Having obtained the requested content (e.g., the requested network resource and embedded resources), the network computing provider may identify a resource profile associated with the requested network resource. Illustratively, the resource profile contains settings for implementing prioritized transmission of the network resource and embedded resources to the client computing device.

The network computing component may then initiate prioritized transmission of the web page and embedded resources to the client computing device according to the resource profile. The resource profile may specify that the HTML file be transmitted as fast as possible, and only then are embedded resources to be transmitted. For example, once the HTML file has completed transfer, the network computing component may transmit various CSS and JavaScript files simultaneously or substantially simultaneously, with high rates of transfer, while images and other embedded resources can also be transmitted simultaneously or substantially simultaneously with lower transfer rates. In addition, the specific rate of transfer applied to each of the CSS and JavaScript files can be customized, based on the importance of the file in rendering the web page. If a particular JavaScript file contains code that controls visual aspects of the network resource, that JavaScript file can be transmitted at a faster rate than other JavaScript files which may not control visual aspects of the network resource.

FIG. 1A is a block diagram illustrative of a networked computing environment 100 for the management and processing of content requests. As illustrated in FIG. 1A, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1A corresponds to a logical association of one or more computing devices associated with a content provider. Specifically, the content provider 104 can include a web server component 110 corresponding to one or more server computing devices for obtaining and processing requests for content (such as web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1A, the content provider 104 can be associated with one or more DNS name server components that would be authoritative to resolve client computing device DNS queries corresponding to a domain of the content provider.

With continued reference to FIG. 1A, the networked computing environment 100 can further include a CDN service provider 106 in communication with the one or more client computing devices 102 and other service providers via the communication network 108. The CDN service provider 106 illustrated in FIG. 1A corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1A as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1A, the networked computing environment 100 can also include a network computing provider 107 in communication with the one or more client computing devices 102, the CDN service provider 106, and the content provider 104 via the communication network 108. The network computing provider 107 illustrated in FIG. 1A also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1A as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

Figure 1B:
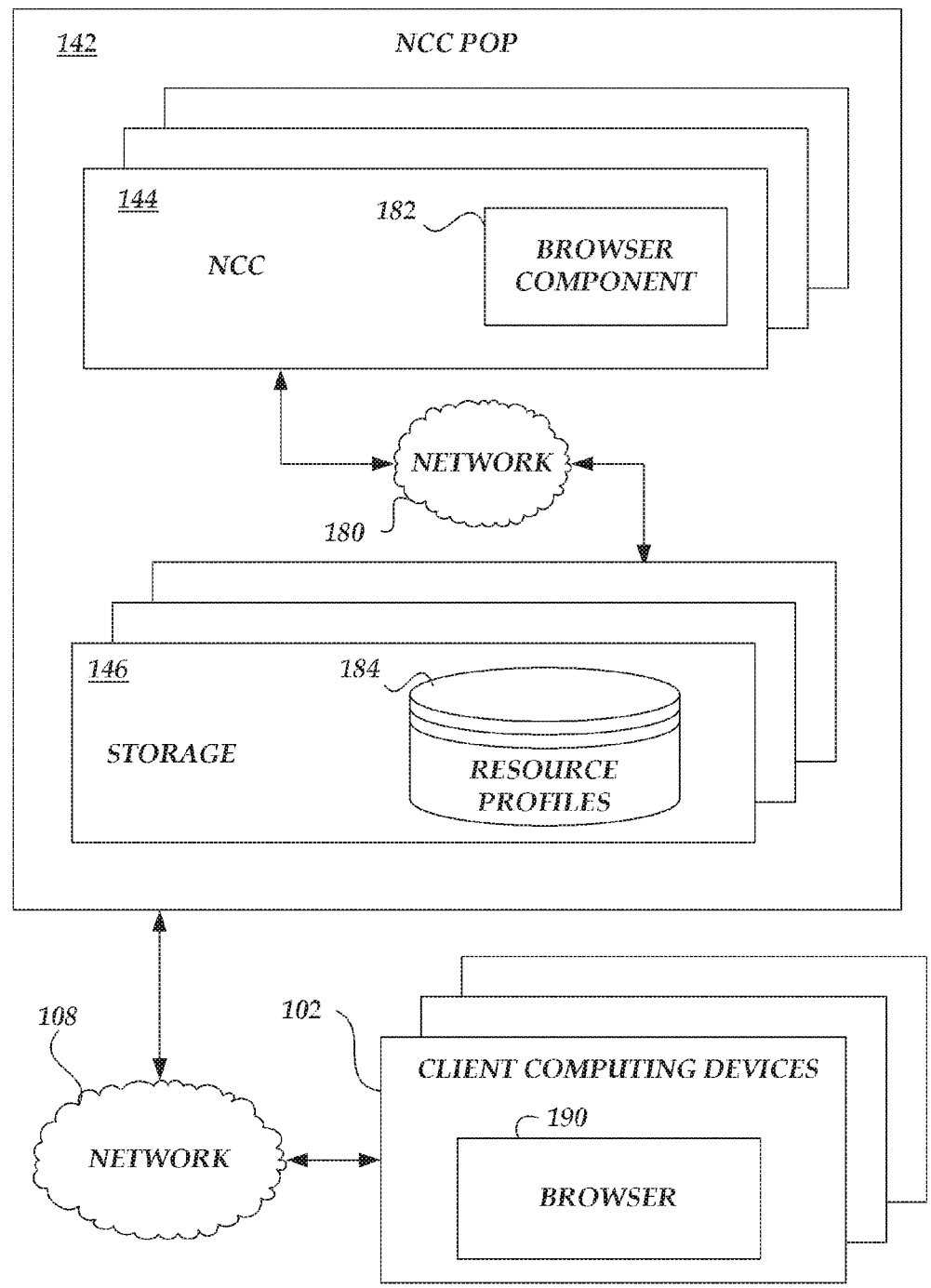
FIG. 1B is a block diagram illustrative of a point-of-presence and client computing device of FIG. 1A illustrating the various components of each.

FIG. 1B is a block diagram schematically illustrating an example of an NCC POP 142, described above with respect to FIG. 1A, that can provide computing resources to multiple client computing devices 102 via a communication network 108. For example, and as described in detail herein, the NCC POP 142 can include any number of NCCs 144 to manage requests from a client computing device 102. An NCC 144 can retrieve a network resource, such as a web page, image, video file, applet, animation, document, or other content object of a web site, from a content source, such as a content provider 104 or CDN service provider 106 as illustrated in FIG. 1A.

Illustratively, the NCC 144 can prioritize the transmission of a web page, and its embedded resources, to a client computing device 102 based on prioritization rules or profile information associated with the web page. For example, the NCC 144 can retrieve web pages and embedded resources from content sources, such as content providers 104 and CDN service providers 106 as shown in FIG. 1A, in response to requests from client computing devices 102. The NCC 144 can then transmit the web page and embedded resources based on relative priorities among the various resources, such as a prioritization specified by a resource profile associated with the page and stored in a storage device 146. The prioritization improves the time required for a client computing device 102 to process and render the web page. In some embodiments, the NCC 144 can transmit some or all of the web page and embedded resources simultaneously, or in a prioritized order. The web page and embedded resources can be transmitted over multiple physical or logical communication channels, such as parallel connections or interleaved virtual connections over a single TCP connection. The connections can be set to transmit the resources at varying speeds based on the prioritization rules or a resource profile. The varied speeds facilitate more efficient use of bandwidth while ensuring that the most important resources are received by the client computing device 102 in an expedited manner.

In addition, the NCC 144 can be configured to determine browsing configurations, which can distribute the processing of network resources between the NCC 144 and the requesting client computing device 102. The NCC 144 can be configured with a browser component 182 that can perform some or all of the processing actions that may typically be performed by a browser 190 on a client computing device 102. Under some browsing configurations, the NCC 144 can process some or all of the requested network resource, either exclusively or in parallel with the client computing device 102. The result of such browsing configurations can be an improvement in performance, speed, reliability, privacy, etc., when compared to the client computing device 102 processing the network resources exclusively.

The NCC POP 142 can include any number of storage components 146, which may include one or more non-transitory storage devices. The storage components 146 can be configured to resource profiles 184 that provide information about how to retrieve and otherwise interact with a network resource. For example, as described above, the resource profiles 184 stored at the storage component 146 may include a separate record or collection of records associated with each web page or other network resource for which a resource profile has been created. The individual resource profiles can contain, among other things, prioritization schedule of embedded resources associated with a primary web page. The resource profiles can be created and maintained by an NCC 144 or some other component of the network computing provider 107.

The NCCs 144 and storage components 146 can communicate with each other over a network 180. The network 180 may, for example, be a publicly accessible network of linked networks, possibly operated by various distinct parties, such as the Internet. In other embodiments, the network 180 may be a private network, such as, for example, a corporate or university network that is wholly or partially inaccessible to non-privileged users. In still other embodiments, the network 180 may include a private network, personal area network, local area network, wide area network, or combination thereof, each with access to and/or from the Internet.

In operation, a client computing device 102 transmits a request for a network resource, such as a web page, via a browser 190. As described herein, the request can be transmitted to a an NCC POP 142 of a network computing provider 107 instead of directly to a content source, and the NCC 144 can retrieve and process the requested web page, and transmit the requested page (or a modified version of it) to the client computing device 102. Retrieval and processing of the requested web page can be conducted according to retrieval rules or a resource profile 184 retrieved from a storage server 146. Retrieval rules and resource profiles can facilitate improved downloading speed when compared to non-prioritized methods, such as retrieving resources over parallel connections in the order that they are referenced in the HTML file, without any prioritization among connections. In some embodiments, retrieval rules or resource profiles can be received from a separate component of the network computing provider 107, or from a third-party service or component outside of the network computing provider 107. In some embodiments, the NCC 144 dynamically determines the retrieval rules, or is configured to follow a set of predetermined rules without receiving them from a separate component or service.

Retrieval rules can be generalized rules that apply to many different web pages rather than a particular web page. For example, one set of retrieval rules implemented by an NCC 144 can specify a prioritized set of resources to transmit first, such as the HTML file and CSS files associated with a web page. The retrieval rules can specify that the rest of the resources are to be transmitted with any remaining bandwidth. Each time transmission of a resource or set of resources completes, the available bandwidth, which was used to transmit the now-completed resource or set of resources, can be re-assigned to the remaining resources. The resources can be reprioritized or the amount of bandwidth used to transmit the resources can be re-adjusted in response to other events, such as a change in the overall amount of available bandwidth or other network conditions.

The retrieval rules can specify more than just a single set of prioritized resources. Instead, the retrieval rules can specify multiple groups or tiers of resources, with higher priority groups transmitted as fast as possible and any number of lower-priority groups transmitted utilizing any remaining bandwidth based on the relative prioritizations of the lower-priority groups, etc. For example, the retrieval rules can specify: (1) the HTML file that defines a web page should be transmitted as fast as possible; (2) cascading style sheet (CSS) files be should transmitted as fast as possible without interfering with the HTML file; (3) JavaScript files should be transmitted as fast as possible without interfering with CSS or HTML files; and (4) the remaining resources, such as images, videos, and the like, should be transmitted without any prioritization. Such a set of retrieval rules may be implemented if it is determined, for example, that pages render more quickly when the browser 190 has the HTML file and all CSS files first, rather than image files. The determination can be made by an administrator, automatically determined by analysis of historical processing measurements, etc. For example, the NCC 144 or some other component can obtain performance metrics associated with the processing of requests for a specific network resource over time, and determine retrieval rules and prioritizations based on an analysis of the performance metrics.

In another example, the retrieval rules can specify that a prioritized resource or group of resources, or a prioritized portion of a resource or group of resources, is to complete transmission to the client computing device 102 before transmission of resource or group of resources associated with a lower priority may begin. In a further example, the lower priority resource or group of resources may transmitted at the same time as the higher priority resources if there is excess bandwidth to do so and transmitting the lower priority resources will not affect the transmission of the higher priority resources. It should be noted that resource profiles, which can apply to a single network resource or group of network resources, can specify the same or similar prioritizations as the example retrieval rules described above.

The NCC 144 can then retrieve the HTML file from a content source and transmit the file over the network 108 to the client computing device 102. The NCC 144 can retrieve embedded resources referenced in the HTML file while the HTML file is being transmitted to the client computing device. In some cases, the NCC 144 may have access to a listing of all embedded resources associated with a web page, and can retrieve them simultaneously with the HTML file so that they are available at the NCC 144 when they are requested by the client computing device 102.

In response to retrieving the HTML file, a client device 102 begins to process the software code corresponding to the web page, parsing it and making requests for any embedded resource referenced in the code as the client computing device 102 encounters them in the HTML file. A client computing device 102 may open a new communication channel or utilize a communication channel that has already been opened but which is idle, in order to request the embedded resource, and then the client computing device 102 can continue to process the HTML file while the requested resource is being received. The NCC 144 can manage the requests received from the client computing device 102 according to the retrieval rules. For example, the NCC 144 can prioritize a request for a CSS file over a request for an image file, even if the image file is actually requested first by the client computing device 102. Prioritizing the CSS file can involve transmitting the CSS file in its entirety before transmitting the image file, or it can involve interleaving transmission of the two files over two virtual communication channels, potentially with other files as well, by transmitting larger portions of the CSS file than of the image file in a given period of time.

In contrast to generalized retrieval rules, which apply to some or all web pages that an NCC 144 will receive requests for, resource profiles can be specific to a single web page, types of web pages, content providers, domains, and the like. For example, a system administrator, an analysis component of the network computing provider 107, or some third-party service may create resource profiles based at least partly on an analysis of historical browsing requests and performance data collected while servicing the browsing requests. One objective, among others, of the analysis is to determine an improved or optimal prioritization for the objects that are referenced by a network resource. For example, a the various resources that are retrieved in conjunction with a request for a particular news web page may include 100 image files, 1 CSS file, and 2 JavaScript files. In many cases, a web page may be displayed before all images have been received. However, in many cases a web page may not be prior to receiving CSS or JavaScript files. Therefore, the CSS file and two JavaScript files can be prioritized over the 100 image files as a generalized retrieval rule. It may not be possible to determine which of the two JavaScript files is more important for a client computing device 102 to have early in the retrieval and rendering process without analysis of historical performance data. In particular, one of the two files may include code that generates or alters visual aspects of the page and which takes a considerable amount of time, relatively speaking, to compile and execute. The other JavaScript file may merely contain a supporting library of functions that have no bearing on the rendering of the web page. By analyzing historical performance when the first file is prioritized over the second as compared to when the second is prioritized over the first, it can be determined that the first is to be prioritized. Alternative analytical methods are possible, such as an analysis of the code against a repository of known JavaScript code and with previously determined prioritization rankings or values. A resource profile can then be created, specifying that the first JavaScript is to be prioritized over the second, or that the first JavaScript is to be transmitted prior to the CSS file in order to provide extra time for parsing and compiling the JavaScript code, etc.

In addition, retrieval rules and resource profiles can be utilized in implementations that do not rely on the client computing device 102 to make subsequent requests for embedded resources. For example, in some embodiments the client computing device 102 transmits a request for a web page to the NCC 144, and the NCC 144 retrieves the requested web page, including the HTML file and any embedded resources referenced therein. The NCC 144 can then initiate transmission of the various files to the client computing device 102 according to the prioritizations defined by the retrieval rules or resource profile associated with the web page, without waiting for or requiring a subsequent request for each embedded resource as the browser 190 of the client computing device 102 encounters embedded references to them. In some embodiments, the NCC 144 may transmit various embedded resources to a cache on the client computing device 102, so that when the client computing device 102 encounters an embedded reference to a resource it will locate the embedded resource in the local cache and not need to transmit a new request for the embedded resource.

The NCC 144 may also utilize prioritized content transmission in conjunction with processing of the network resource in the browser component 182 of the NCC 144. For example, as described in detail below, the NCC 144 may determine that the network resource or some subset of one or more an embedded resources be processed in whole or in part in the browser component 182 prior to transmission to the client computing device 102. The transmission of the processed resources can be prioritized according to retrieval rules or resource profiles. In cases where a resource is to be processed in parallel at both the client computing device 102 and the NCC 144, or when the resource is to be processed exclusively at the client computing device 102, transmission of the unprocessed resource can be prioritized according to retrieval rules or resource profiles.

With reference now to FIGS. 2, 3A, 3B, 4A, 4B, 5A, 6B, and 6 (FIGS. 2-6), the interaction between various components of the networked computing environment 100 of FIG. 1A will be illustrated. Specifically, FIGS. 2-6 illustrate the interaction between various components of the networked computing environment 100 for the exchange of content between a client computing device 102 and a content provider 104 via the network computing provider 107. In one embodiment, illustrated in FIGS. 2, 3A, 4A, 5A, and 6, a request for a network resource is serviced by an NCC POP, which retrieves the files associated with the requested resource and processes the resource in a browser instance to generate an initial processing result for the client computing device. In another embodiment, illustrated in FIGS. 2, 3B, 4B, and 5B, a request for a network resource is serviced by an NCC POP according to retrieval rules or a resource profile for the resource. The files associated with the resources, such as embedded resources, are retrieved from content sources and transmitted to the client computing device 102 according to prioritization data specified by the retrieval rules or the resource profile. Additional embodiments are possible, and various features of the illustrated embodiments may be combined. For example, the resource can be retrieved and processed by a browser instance, and transmissions to the client computing device, which may include processed resources or the original resources as retrieved from the content provider, may be prioritized according to retrieval rules or a resource profile. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
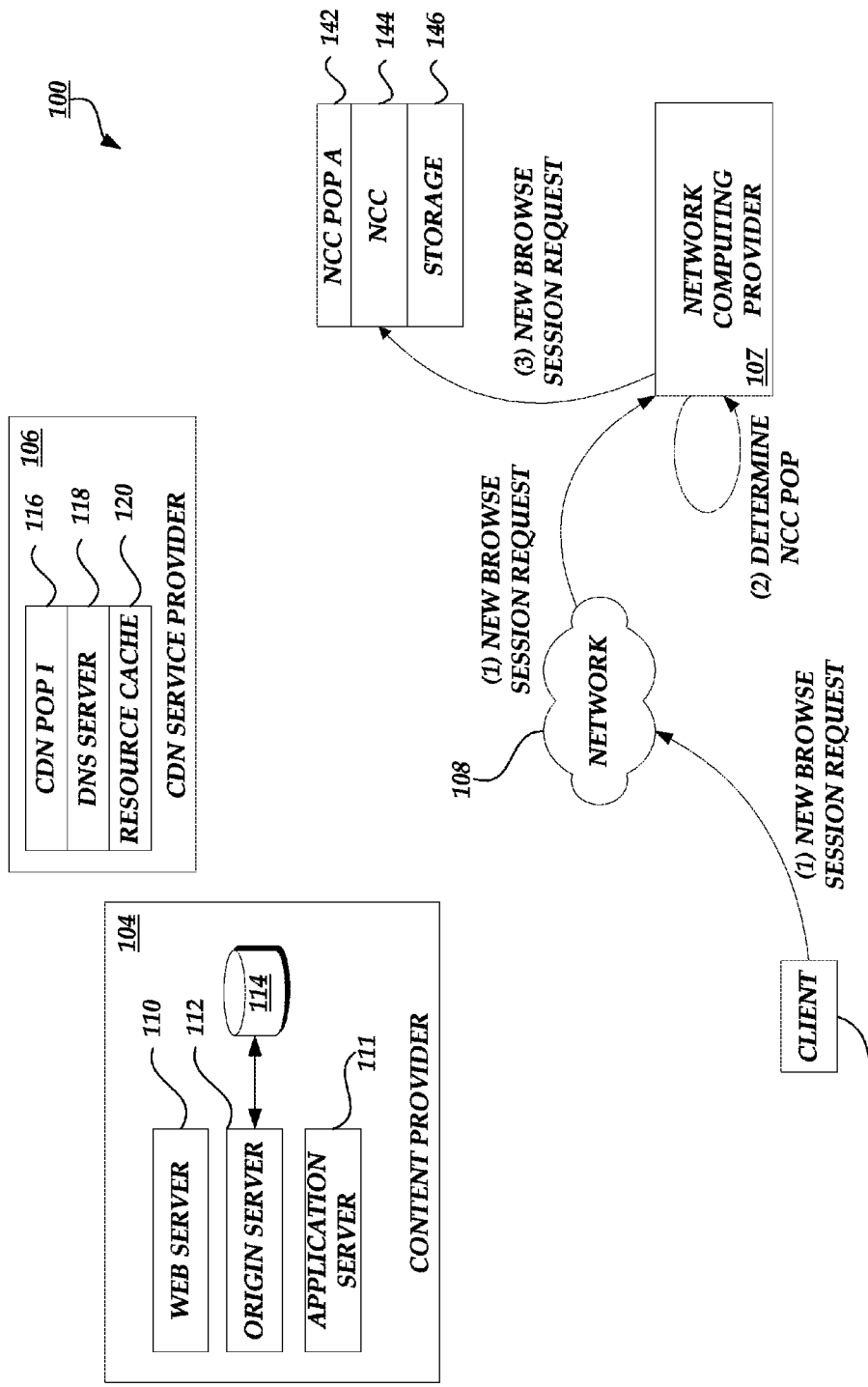
FIG. 2 is a block diagram of the content delivery environment of FIG. 1A illustrating the generation and processing of a new browse session request from a client computing device to a network computing provider.

With reference to FIG. 2, the process can begin with the generation and processing of a browse session request from a client computing device 102 to a network computing provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3A:
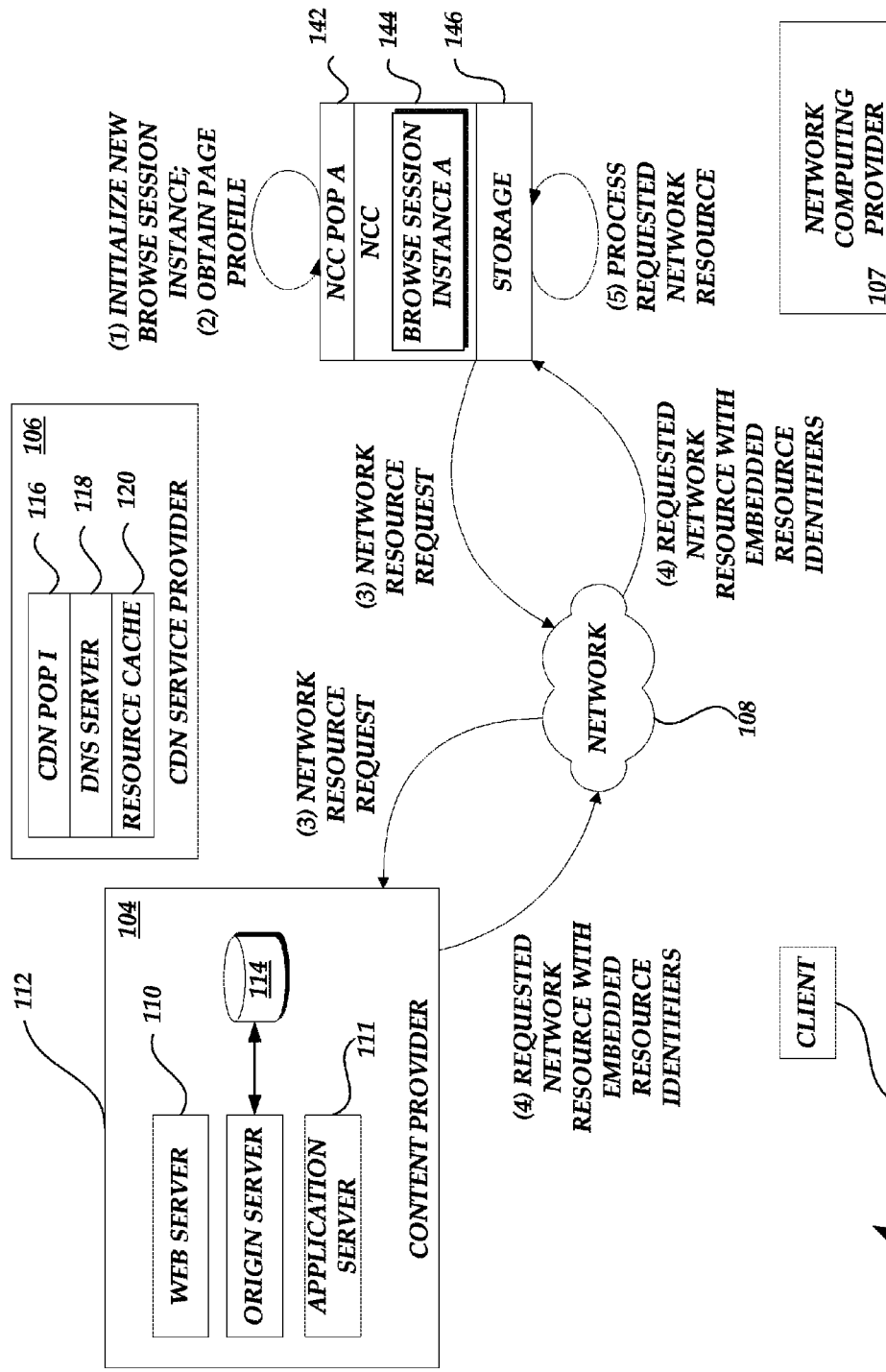
FIG. 3A is a block diagram of the content delivery environment of FIG. 1A illustrating the generation and processing of a request for a network resource from a network computing provider to a content provider.

With reference to FIG. 3A, an illustrative interaction for generation and processing of a request for a network resource from a network computing provider 107 to a content provider 104 will be described. As illustrated in FIG. 3A, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a web page, such as "http://www.xyzsite.com/default.htm." NCC POP 142 may resolve the URL to an IP address through a DNS resolver associated with the network computing provider (not shown), and may request the web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3A, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a web page may include embedded CSS style information and JavaScript as well as embedded resource identifiers to additional resources such as text, images, video, audio, animation, executable code, and other HTML, CSS, and JavaScript files. In the process of extracting the embedded resource identifiers, the NCC POP 142 may gather information about the processed network resources for later use in the determination of a remote session browsing configuration as discussed below with reference to FIG. 4A.

Figure 4A:
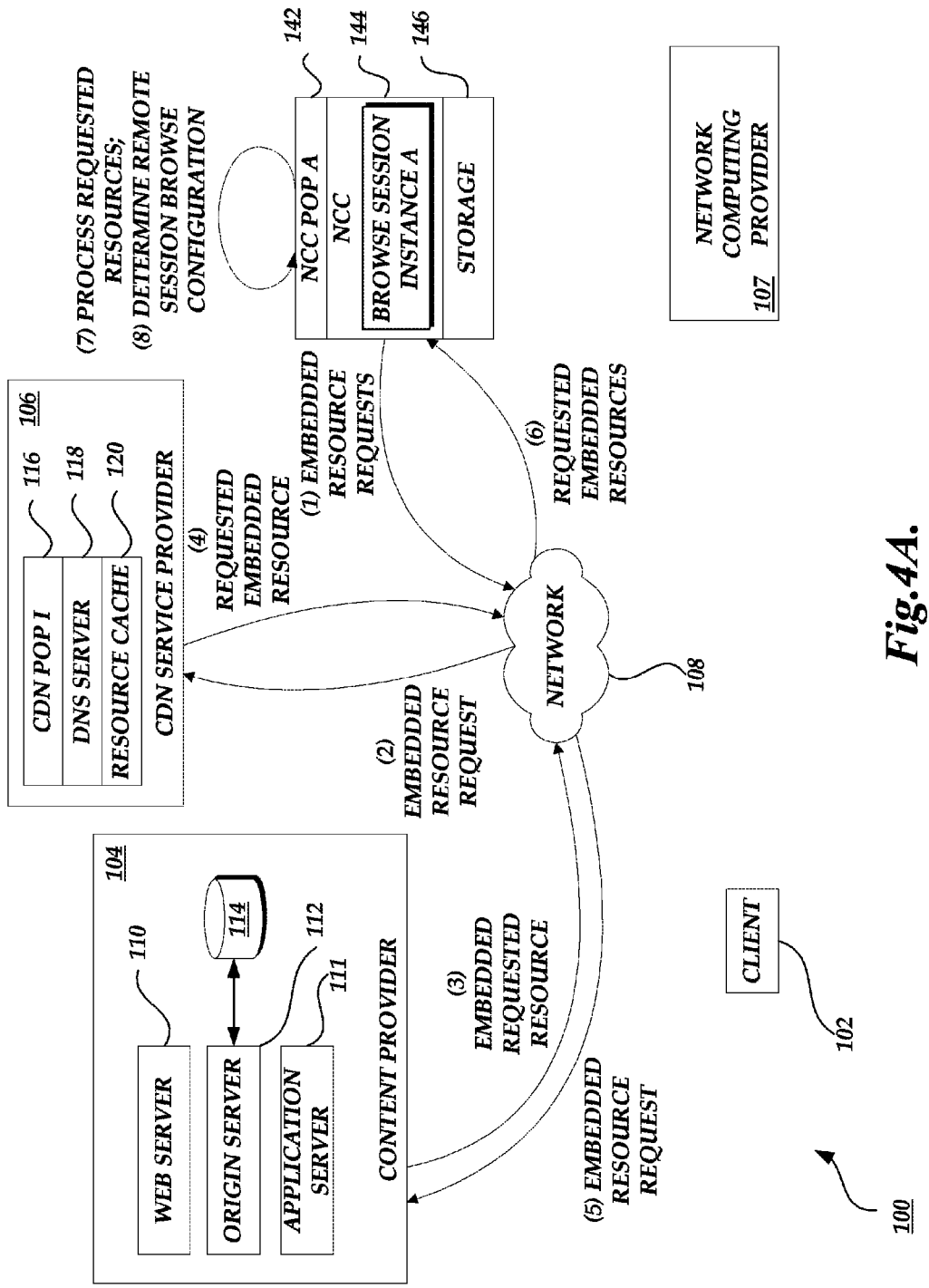
FIG. 4A is a block diagram of the content delivery environment of FIG. 1A illustrating the generation and processing of one or more requests corresponding to one or more embedded resources from a network computing provider to a content provider and content delivery network.

With reference to FIG. 4A, an illustrative interaction for generation and processing of one or more requests corresponding to one or more embedded resources from a network computing provider to a content provider and content delivery network is disclosed. As illustrated in FIG. 4A, the selected NCC POP 142 may provide resource requests to one or more sources of content such as content provider 104 and CDN POP 116. The resource requests may correspond to embedded resources based on one or more embedded resource identifiers extracted from a requested network resource (e.g., a web page) as described in FIG. 3A above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5A:
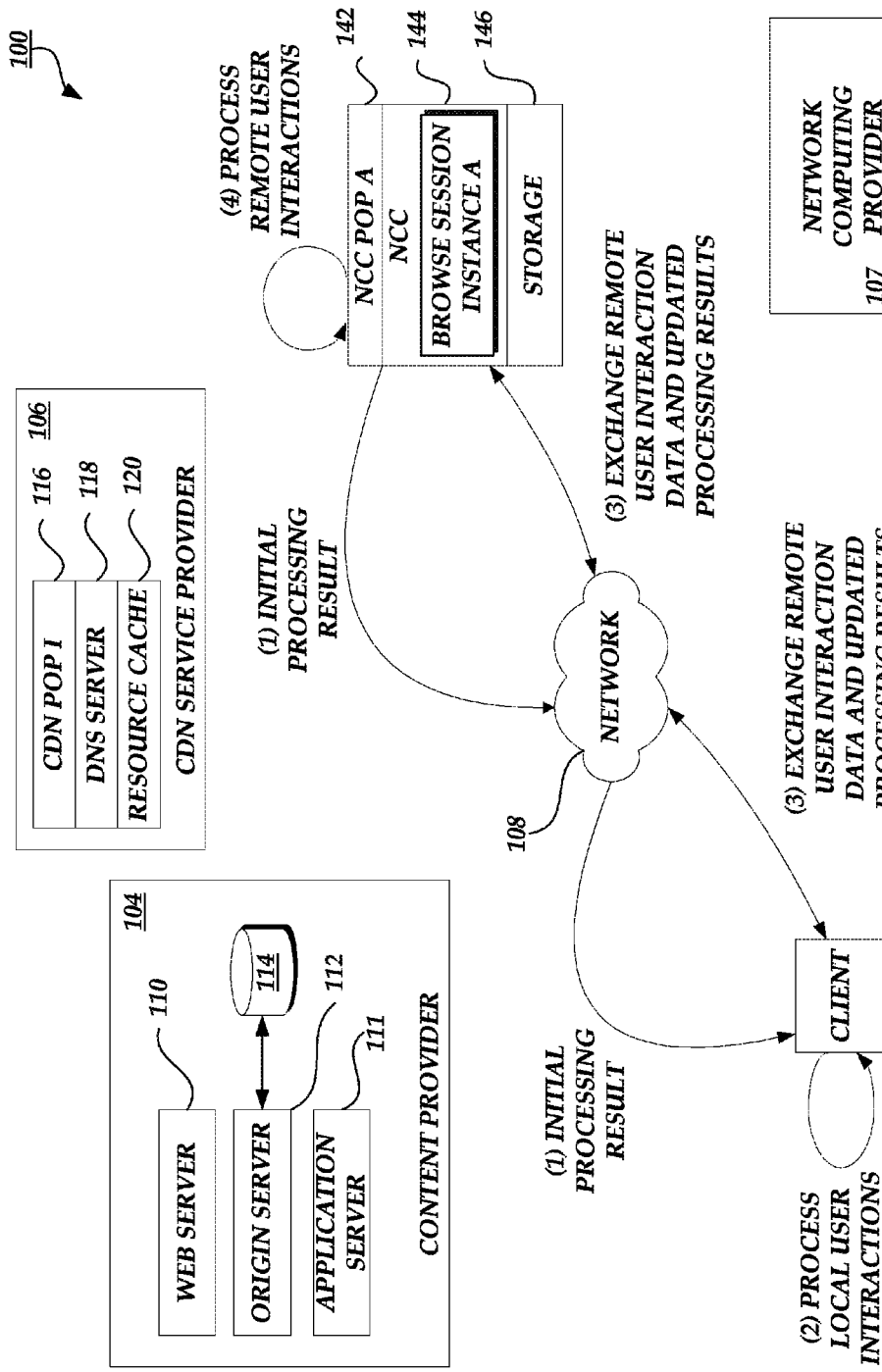
FIG. 5A is a block diagram of the content delivery environment of FIG. 1A illustrating the generation and processing of browse session data and user interaction data between a network computing provider and client computing device.

With reference to FIG. 5A, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5A, the selected NCC POP 142 may provide an initial processing result to the client computing device 102 over the network 108. The initial processing result may correspond to requested network content, such as a web page, along with associated embedded resources processed by the NCC POP 142 in accordance with a selected remote session browsing configuration as described in FIG. 4A above. The NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device in response to changes to the content or remote user interaction data from the client computing device.

Figure 6:
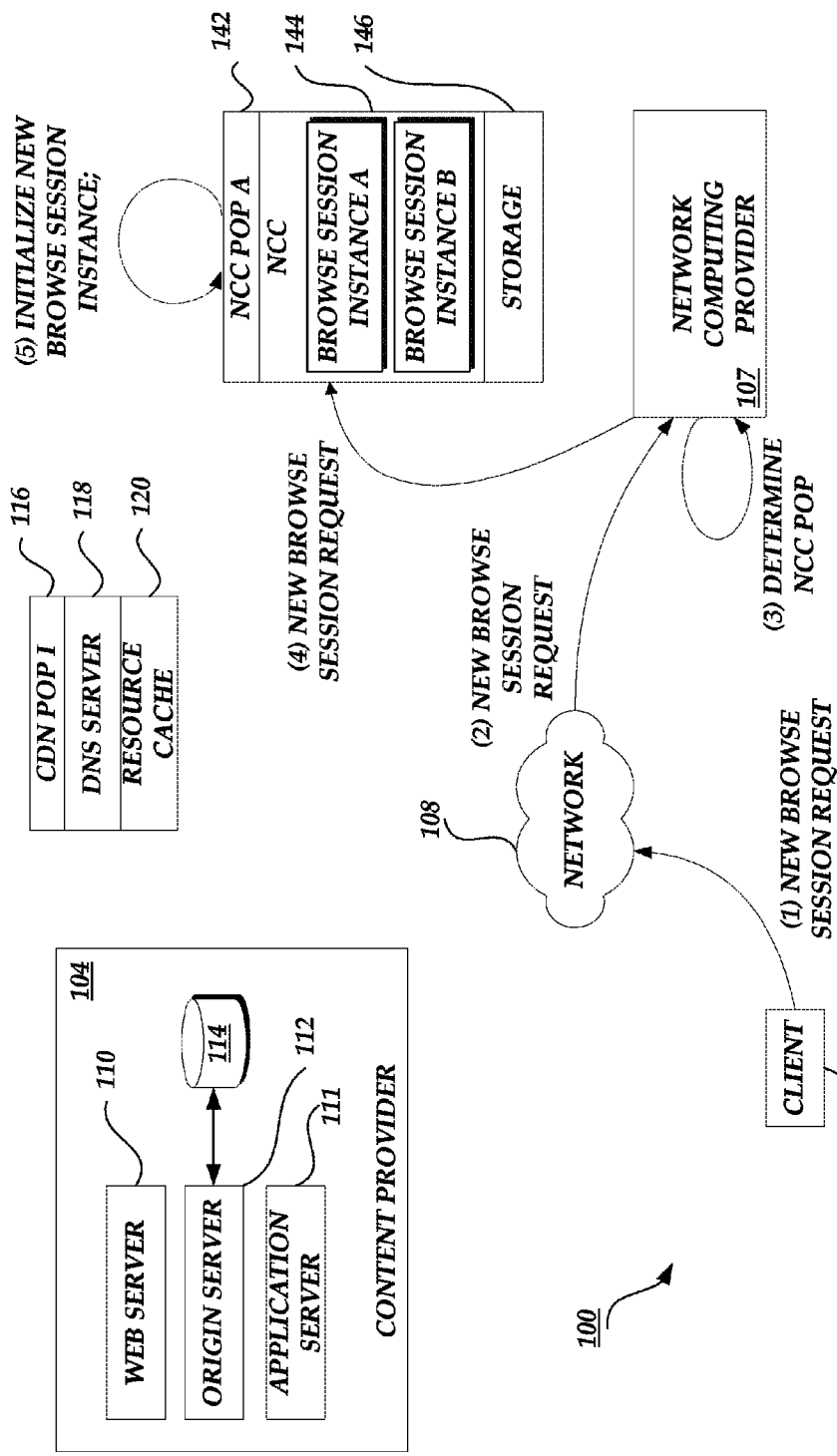
FIG. 6 is a block diagram of the content delivery environment of FIG. 1A illustrating the generation and processing of an additional new browse session request from a client computing device to a network computing provider.

With reference to FIG. 6, a block diagram of the content delivery environment of FIG. 1A illustrating the generation and processing of an additional new browse session request from a client computing device to a network computing provider is disclosed. As illustrated in FIG. 6, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first web page corresponding to a first browse session instance may follow a link that opens a new tab or browser window to view a second web page. In one embodiment, any required steps of obtaining and processing content associated with the second web page may be performed by the currently instantiated network computing component in which the browser can handle the processing of both resource requests. In another embodiment, the client computing device 102 request may be processed as a new browse session request to the network computing provider 107, including the network address of the second web page. In this embodiment, the browser on the client computing device may not specifically request a separate browse session, and a user's interaction with the browser on the client computing device 102 may appear to be part of a same browsing session. As described above with regard to FIGS. 2 and 3A, the network computing provider 107 may cause an instantiation of a network computing component for obtaining and processing content associated with the second web page. In other embodiments, a new browse session request may be generated by the client computing device 102 corresponding to sections of a network resource (e.g., frames of a web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including web pages or other documents, text, images, video, audio, executable scripts or code, or any other type of digital resource.

Subsequent to the receipt of the browse session request, the network computing provider 107 may select an associated network computing component such as NCC POP 142 to service the browse session request. As discussed above with reference to FIG. 2, a network computing provider 107 may select an NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

Figure 3B:
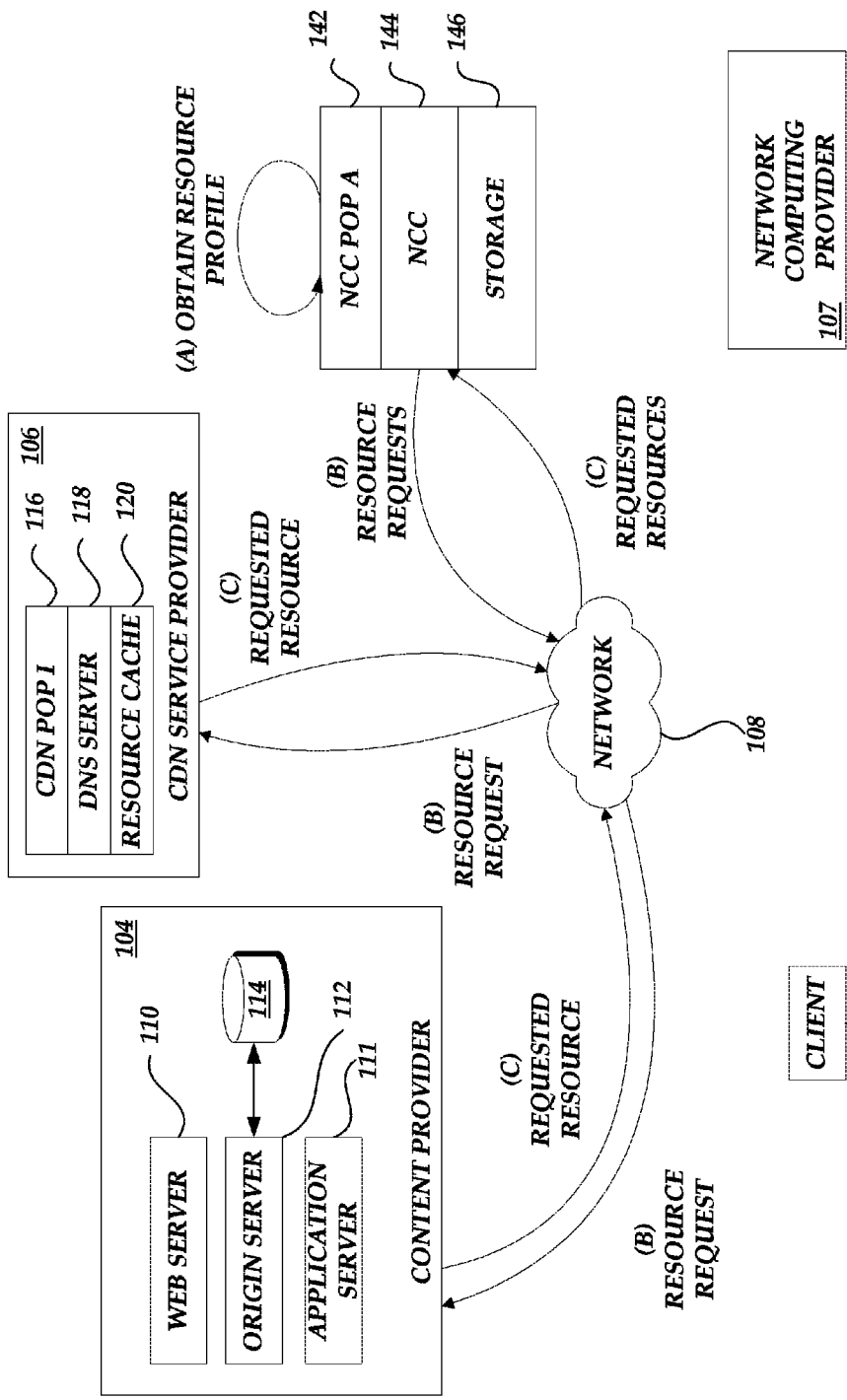
FIG. 3B is a block diagram of the content delivery environment of FIG. 1A illustrating the retrieval of a network resource and embedded resources responsive to a request from a client computing device.
Figure 4B:
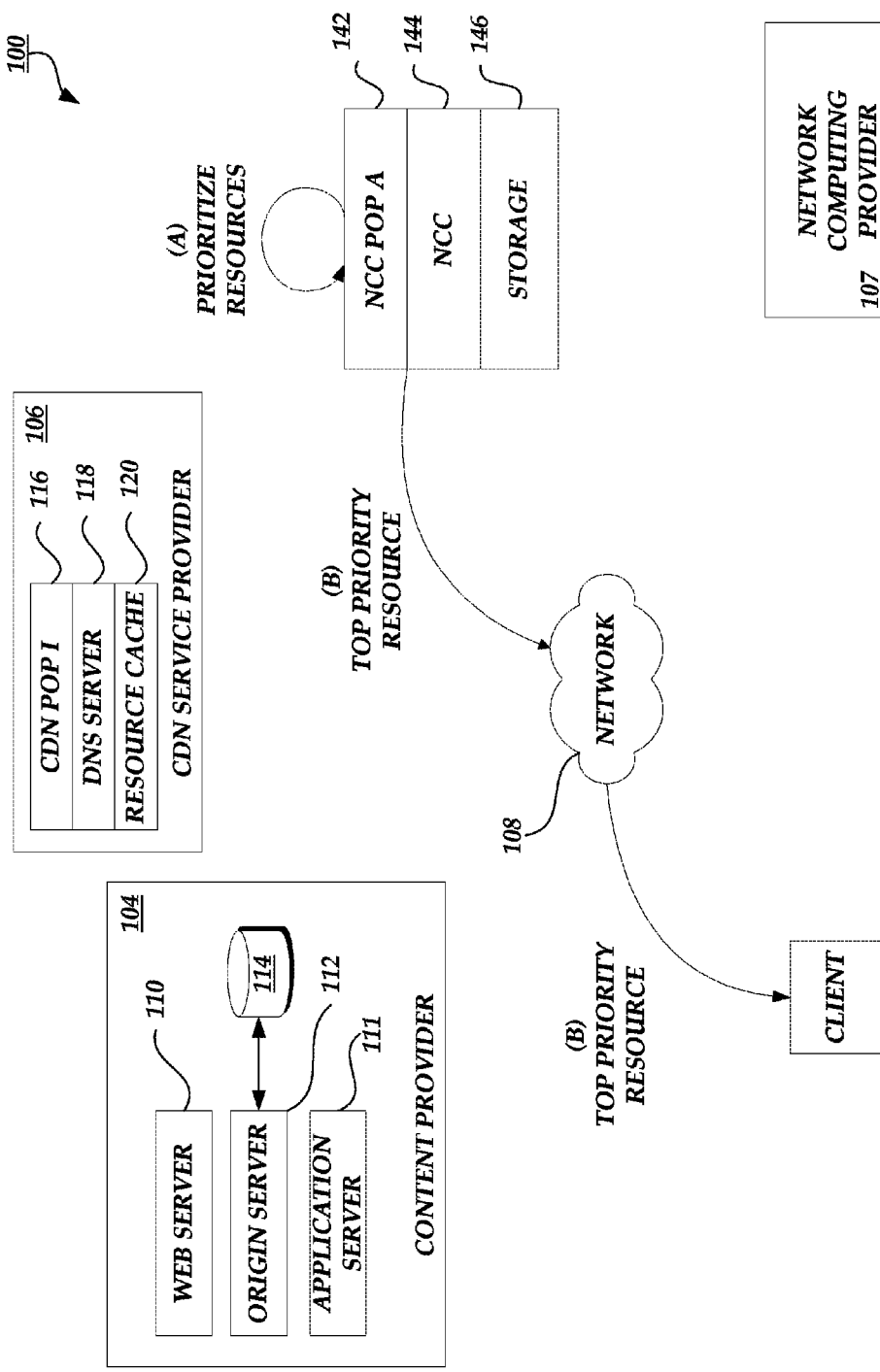
FIG. 4B is a block diagram of the content delivery environment of FIG. 1A illustrating the prioritization and transmission of the network resource response to a request from a client computing device.
Figure 5B:
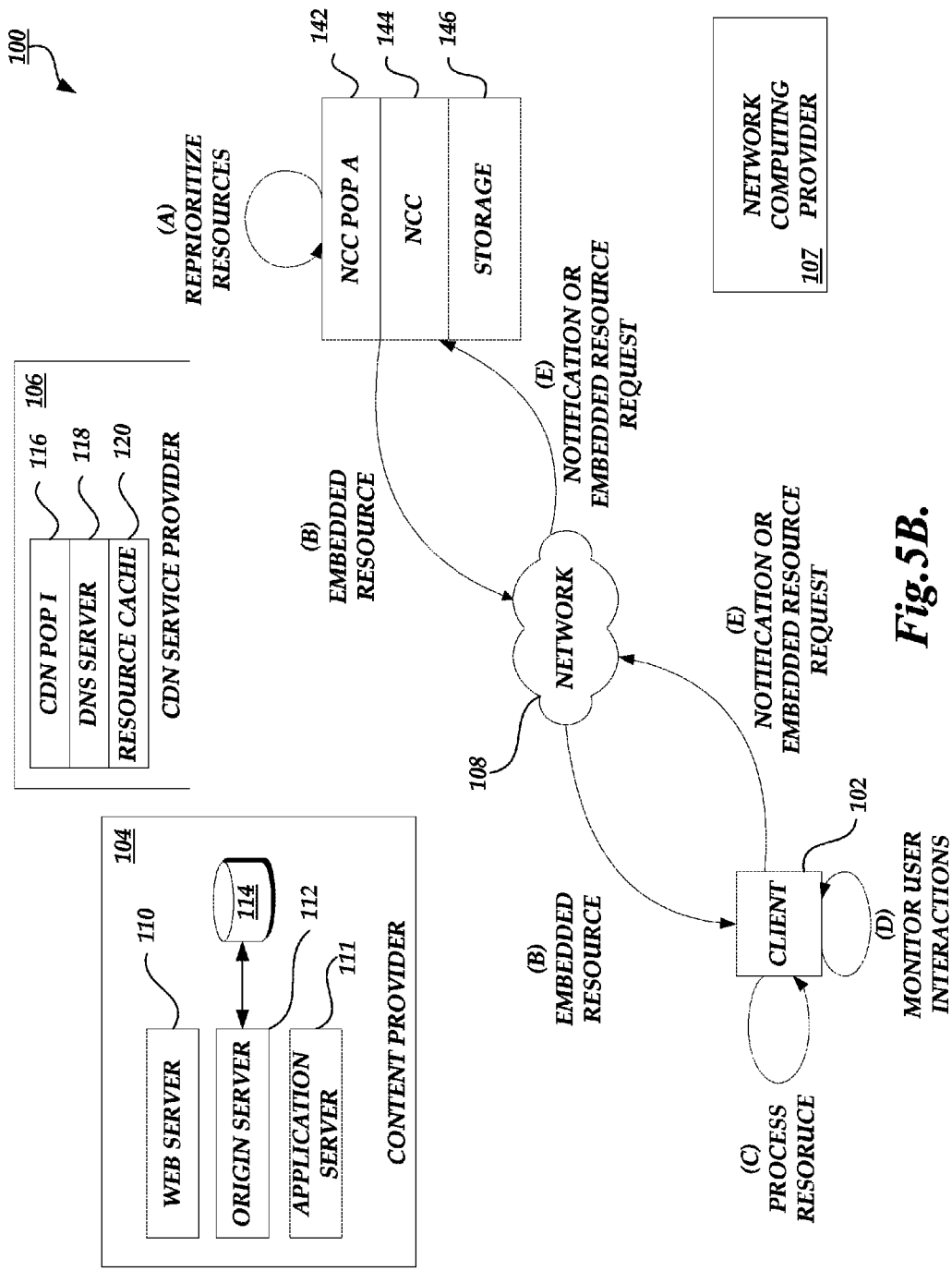
FIG. 5B is a block diagram of the content delivery environment of FIG. 1A illustrating the prioritization and transmission of embedded network resources to a client computing device.

FIGS. 3B, 4B, and 5B illustrate the prioritized retrieval of a network resource in response to a request from a client computing device 102, as illustrated and described above with respect to FIG. 2. The network interactions illustrated in FIGS. 3B, 4B, and 5B can occur instead of or in addition to the network interactions illustrated in FIGS. 3A, 4A, and 5A, described above. For example, an NCC POP 142 may initialize a browser component 182 and retrieve resources for processing in the browser component 182. In such a case, the NCC POP 142 may follow the sequence illustrated in FIGS. 3A, 4A, and 5A. Alternatively, the NCC POP 142 may initiate prioritized transmission of network resources to a client computing device 102. In such a case, the NCC POP 142 may follow the sequence illustrated in FIGS. 3B, 4B, and 5B, described below. In some embodiments, the NCC POP 142 may determine on a request-by-request basis whether to utilize a browser component 182 for processing at the NCC 144, or whether to initiate prioritized transmission of the resources to the client computing device 102. In some embodiments, some or all of the processes and communications described with respect to FIGS. 3A, 3B, 4A, 4B, 5A, and 5B may be combined. For example, the NCC POP 142 may process network resources in a browser component 182 and also transmit the resources and/or a processing result to the client computing device 102 according to prioritized retrieval rules or a resource profile.

FIG. 3B illustrates the retrieval of a network resource and embedded resources according to a resource profile. In response to receiving a request from a client computing device 102, the NCC POP 142 obtains profile information associated with the requested network resource. For example, the NCC 144 can load a resource profile 184 for the requested network resource from a storage component 146. The resource profile information can correspond to a specific network resource or set of network resources. For example, the profile information may apply to all web pages associated with a particular domain (e.g., all web pages associated with www.xyzwebsite.com). In another example, one or more network resources may have specific profiles. The specific profiles may be the only profile for a resource, it may replace a profile that would otherwise be generally applicable (such as a default profile for a set of resources), or it may supplement information from one or more retrieval rules.

In some embodiments, the resource profile information can specify, among other things, a listing of all embedded resources associated with the requested network resource. This can allow the NCC 144 to initiate retrieval of all embedded resources immediately, rather than waiting for retrieval and parsing of the primary network resource. For example, the profile information may specify the network address of each CSS file, JavaScript file, and image file associated with a web page, and the NCC 144 can initiate retrieval of each of those resources prior to receiving the complete HTML file and parsing it to access the references to the embedded resources. In many cases the NCC 144 will have high speed network connection that will not experience substantial performance degradation when simultaneously retrieving many or all of the embedded resources specified in the resource profile. This is in contrast to client computing devices 102, which in many cases may have a network connection that experiences noticeable performance degradation when attempting to retrieve a large number of resources and embedded resources simultaneously without some mechanism to prioritize the several connections.

Additionally, in some embodiments, the resource profile information may maintain other information, such as prioritization information for each of the several resources associated with a web page. In one embodiment, the NCC POP 142, some other component of the network computing provider 107, or some third-party service collects performance metrics and other information related to the optimization of the network resources obtained in response to the client computing device 102 requests. For example, data reflective of file sizes, transfer rates, transfer times, processing times, and other information related to the retrieval, processing, and transmission of network resources can be collected and analyzed in order to determine prioritization rules and resource profiles. In some embodiments, information about the location of the content source or the client computing device 102 can be collected. For example, U.S. patent application Ser. No. 13/431,687, filed on Mar. 27, 2012, titled "Optimized Retrieval of Network Resources," and incorporated herein by reference, discloses, among other things, a method of determining when a client computing device 102 should request a resource directly from a content source rather than from an intermediary server such as the NCC POP 142. The determination can be made based on the geolocation of the client computing device 102 and the content source. If the NCC POP 142 determines that it is faster or otherwise more efficient for the client computing device 102 to retrieve one or more resources directly from the content source rather than from the NCC POP 102, the NCC POP 142 can transmit profile information to the client computing device 102, instructing the client computing device 102 where to retrieve the resources from. In the present example, the profile information may additionally include prioritization information that instructs the client computing device 102 which resource requests to prioritize and in what fashion, as described above with respect to the NCC POP 102.

Illustratively, the collection and processing of network resource information to generate prioritization information can correlate to a continuous process implemented by the network computing provider 107. Additionally, the network computing provider 107 can begin generating prioritization information after obtaining a network resource a single time or for a single client computing device 102. Alternatively, the network computing provider 107 can set a minimum threshold number of requests, a minimum threshold number of requests from different client computing devices 102 or types of client computing devices 102, or threshold number of times a particular network resource is requested prior to processing the information to generate prioritization information. Still further, in other embodiments, the network computing provider 107 can process a base network resource, such as a web page, that may have one or more embedded resources and obtain the embedded resources in advance of receiving a request from a client computing device 102. In this embodiment, the network computing provider 107 may process the resources requested in advance to also generate prioritization information.

FIG. 4B illustrates the initial prioritized transmission of a network resource to a client computing device 102. Continuing the illustrative example of FIG. 3B, the network resource may be a web page primarily defined by an HTML file. The NCC POP 142 can transmit the HTML file over the connection as fast as possible so that the client computing device 102 can parse it and begin requesting embedded resources from the NCC POP 142. In some embodiments, the NCC POP 142 provides all responsive resources or an initial processing result without waiting for a request from the client computing device 102. In such a case the NCC POP 142 does not necessarily provide the HTML document as fast as possible, because the NCC POP 142 parses the document to verify that it has retrieved the all required resources according to the resource profile 184 and initiates transmission of the embedded resources to the client computing device 102.

FIG. 5B illustrates the processing of subsequent requests from the client computing device 102 to the NCC POP 142 for embedded resources. For example, while receiving an HTML file as illustrated in FIG. 4B, the client computing device 102 may begin to parse the received portion to begin requesting embedded resources referenced therein, such as CSS files or JavaScript files referenced in the <head> section. Such requests for embedded resources can be transmitted to the NCC POP 142, which then transmits the responsive file according to the prioritization of the resource profile or the retrieval rules. Alternatively, the NCC POP 142 may be controlling transmission, sending files to the client device 102 each time a file has finished downloading to the client device 102, or reprioritizing and resetting data transfer rates each time a file has finished downloading to the client device 102. The client computing device 102 may send a notification to the NCC POP 142 that it has received the entire file, or the NCC POP 142 can monitor the file transfer and determine when file transfer has finished. In either case, the NCC POP 142 can then select one or more additional files to transmit to the client computing device 102, or reprioritize the files already being transmitted, according to prioritization data obtained from the retrieval rules or the resource profile.

The prioritizations specified in the resource profile or prioritization rules can be either absolute or relative. In either case, the prioritizations provide instructions, rankings, or other values to aid the NCC POP 142 in consuming all available bandwidth while ensuring that higher priority resources arrive at the client computing device before resources associated with a lower priority. By specifying that a first resource or group of resources is to be prioritized over a second resource or group of resources, the resource profile or prioritization rules instruct the NCC POP 142 to adjust the bandwidth used to transmit each resource, or to adjust the order that each resource is transmitted, so that the first resource or group of resources finishes transmission prior to the second resource or group of resources.

Routing protocols on the Internet do not typically support a convenient mechanism for prioritizing multiple active connections. Therefore, in one embodiment, multiple files are simultaneously sent to the client computing device 102 over a single communication channel, such as a single TCP connection between the client computing device 102 and the NCC POP 142. A single TCP connection can support multiple virtual communication channels or data streams. For example, by interleaving multiple data streams utilizing the SPDY protocol, prioritization can be implemented such that each data stream can carry data to the client computing device 102 at a different effective speed. Therefore, prioritization of multiple files transmitted simultaneously to the client computing device 102 can be achieved by altering the transfer rate of each data stream. In general, this can be done by configuring the data streams associated with higher-priority items to transmit at a faster rate than data streams associated with lower-priority items. Upon transfer completion of any individual resource, another resource can be transmitted over the freed data stream.

In some embodiments, the client computing device 102 may have a high-speed connection to the NCC POP 142, or the requested resource may be very small. Prioritization of the various embedded resources according to retrieval rules or a resource profile may not provide any improvement in speed or efficiency. In such cases, the NCC POP 142 can ignore prioritization of individual embedded resources and proceed to transmit each resource—either serially or in parallel—as fast as the client computing device 102 can receive them. In some embodiments, the prioritization or accompanying data transfer rates of resources can be changed while they are being transmitted. For example, if transmission of a high-priority resource has completed and only low-priority resources remain to be transmitted, the speed at which the remainder of the resources currently being transmitted can be increased. The remaining lower-priority resources can then be transmitted at an appropriately low rate according to the prioritized retrieval rules or resource profile.

Additionally, the prioritization of resources can be dynamically changed based on user interactions at the client computing device 102. For example, the resource profile for a web page may specify that items which will be visible in the initial display of a web page on the client computing device 102, such as images at the top of the web page illustrated in FIG. 7A, be prioritized over items which may not be visible in the initial display of the web page, such as images near the bottom of the web page illustrated in FIG. 7B. In response to receiving a notification that the user has changed the display at the client computing device 102, such as by scrolling to the bottom of the page, the transmission of images to be displayed at the bottom can by dynamically prioritized ahead of the images to be displayed at the top. The network computing provider 107 or other component that creates resource profiles may have access to technical information about client computing devices 102 that request the network resources. For example, the network computing provider 107 may have access to the display size and resolution. In some cases, this information may come from the browser 190 or some other component on the client computing device 102. The browser 190 may be provided by or otherwise tightly integrated with the network computing provider 107, thereby providing the network computing provider 107 with access to such technical details even though they may not typically be available from browsers. The network computing provider 107 may then include details in the resource profile about the display size of one or more client computing devices 102, along with prioritizations tailored to different displays.

Figure 7A:
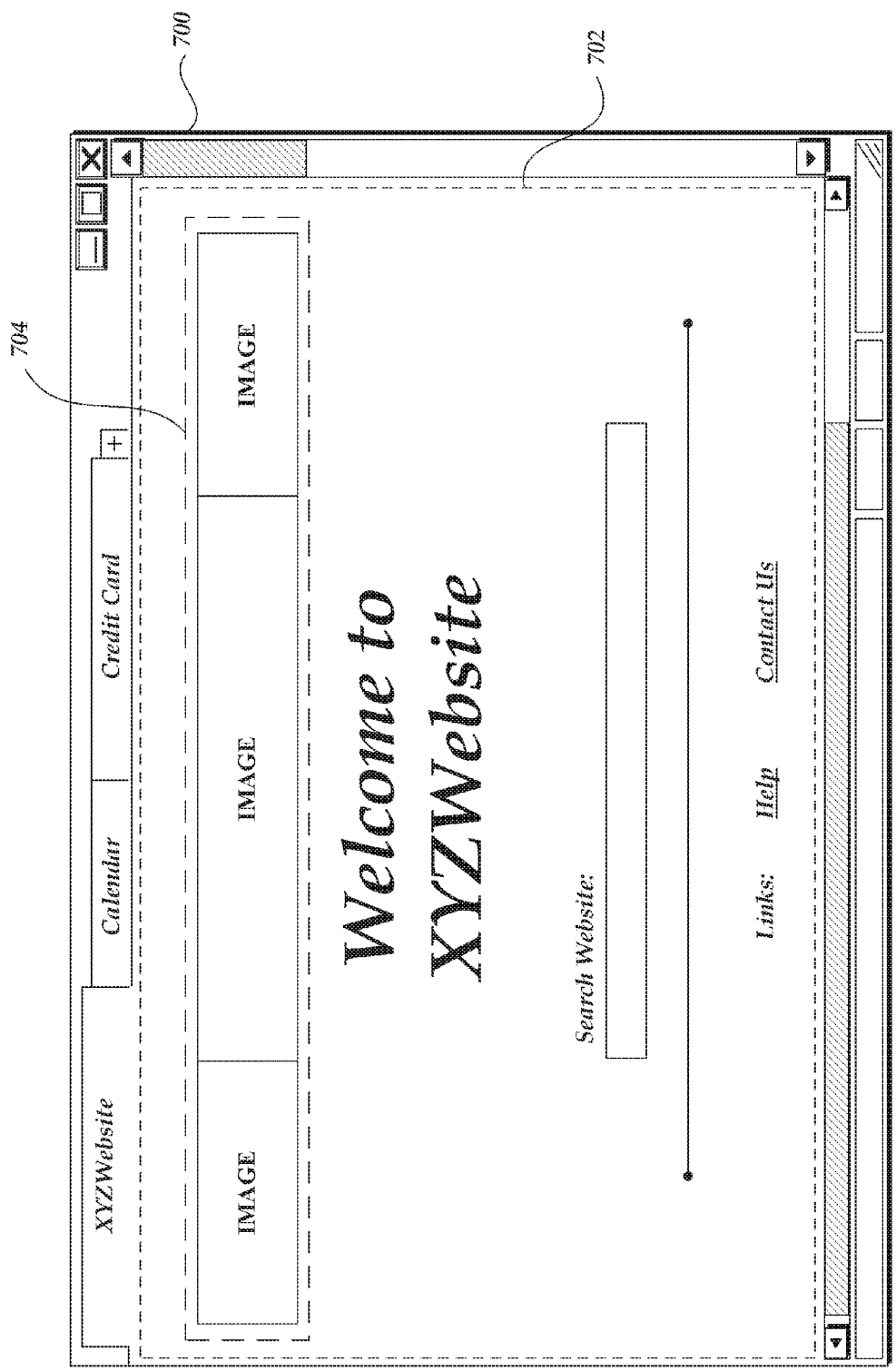
FIG. 7A is a user interface diagram depicting an illustrative browser interface and display of browse session content.

FIG. 7A is a user interface diagram depicting an illustrative browser interface 700 and display of browse session content. As described above with reference to FIG. 5A, a browser interface 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 7B:
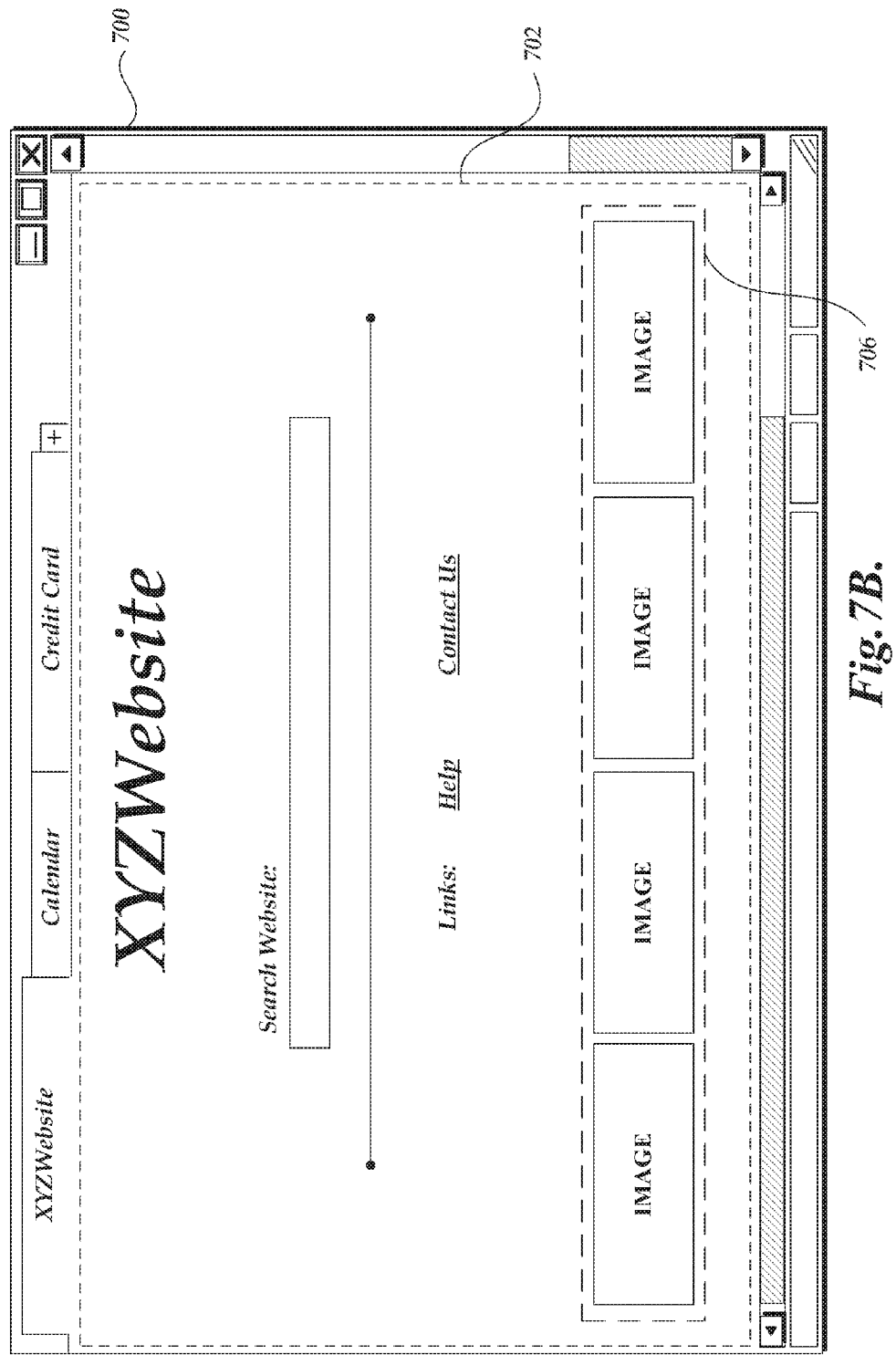
FIG. 7B is a user interface diagram depicting the browser interface of FIG. 7A displaying another portion of browse session content.

The illustrative web page displayed in the browser interface 700 of FIG. 7A has images 704 displayed near the top of the browser interface 700. As described above, the images that are initially visible on the display of the client computing device 102 may be prioritized during transmission over images that are not initially visible. For example, images displayed at the bottom of the page may be assigned a lower priority and transmitted to the client computing device 102 only after all other images have been transmitted. When a user interacts with the browser interface 700, for example by scrolling the display to the bottom of the web page, the images 706 at the bottom will then come into view as illustrated in FIG. 7B. In some embodiments, the browser or some other component of the client computing device 102 can transmit interaction data to the NCC POP 142, which can adjust the prioritization of images. In this example, the NCC POP 142 may lower the prioritization of the images 704 at the top of the web page, and raise the prioritization of the images 706 at the bottom of the web page so that those images 706 can be more quickly transmitted to the client computing device 102 and displayed to the user.

Figure 8:
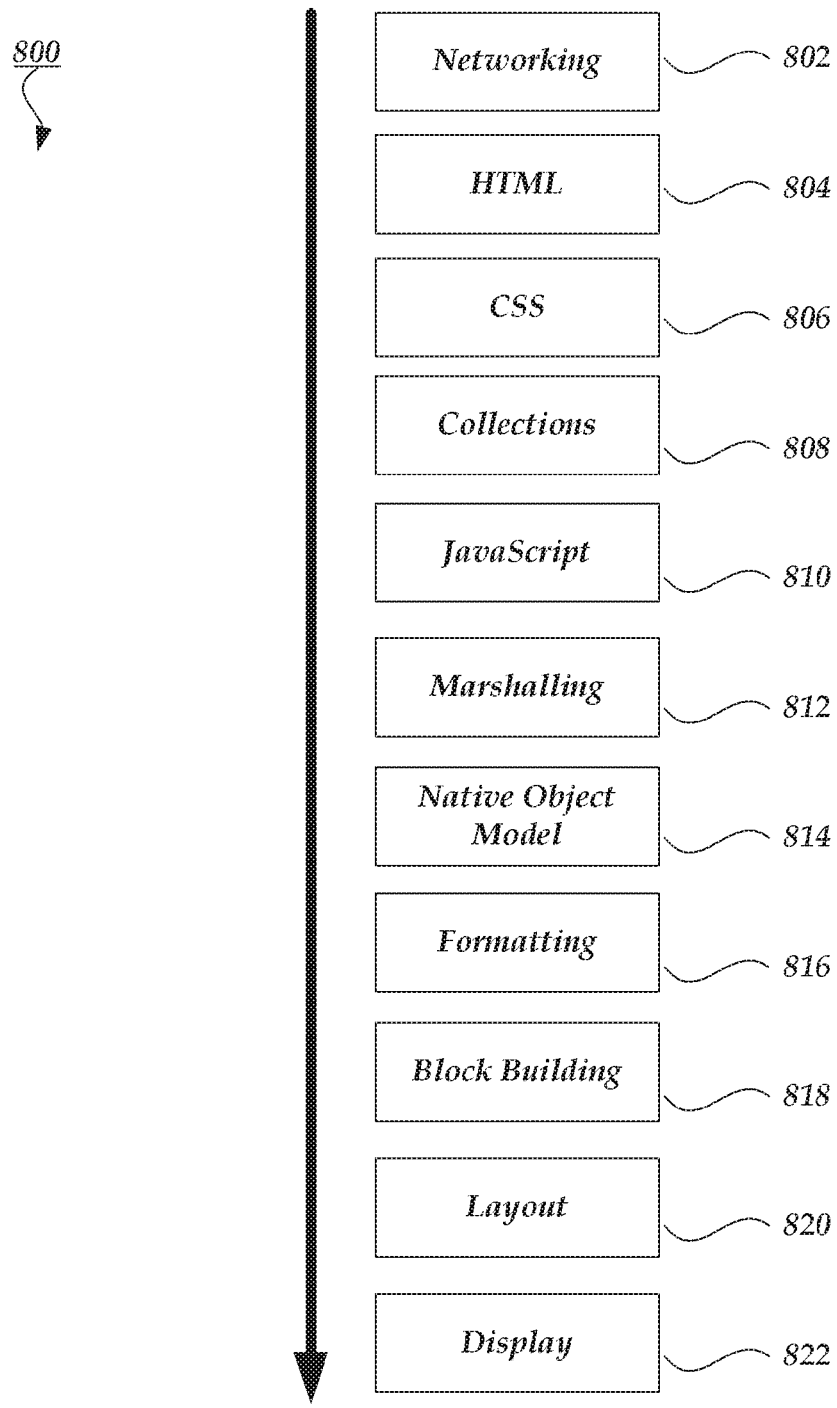
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3A, 4A, and 5A, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of web pages or other web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When JavaScript is encountered, it may be passed directly to a JavaScript subsystem 810 responsible for executing the script. The JavaScript subsystem 810 has been examined fully over the years, and may be one of the most well-known browser subsystems in the art. A remote session browsing configuration that splits processing actions at a JavaScript subsystem 810 may construct a processing result including an internal representation of one or more JavaScript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
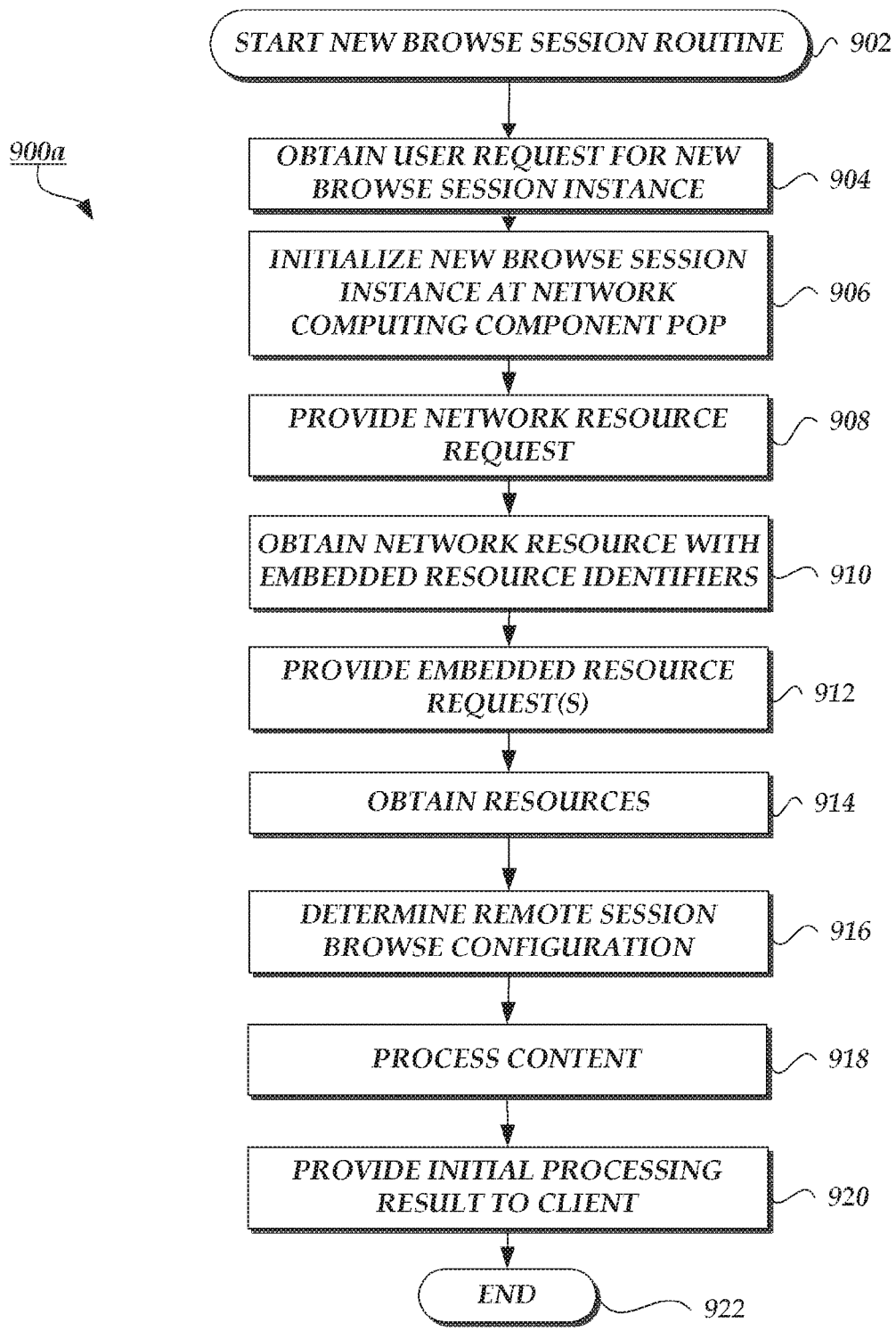
FIG. 9 is a flow diagram illustrative of a new browse session routine implemented by network computing provider.

FIG. 9 is a flow diagram illustrative of a new browse session routine 900 implemented by network computing provider 107 of FIG. 1A. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1A, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., web pages, video, Flash documents) may require various processing actions before being displayed on a computing device. A web page, for example, may be parsed to process various HTML layout information and references to associated resources or embedded content such as CSS style sheets and JavaScript, as well as embedded content objects such as images, video, audio, etc. The HTML and each referenced object or piece of code will typically be parsed and processed before a representative object model corresponding to the web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, JavaScript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular web site, network domain, or set of related resources. A content provider that historically has provided video-heavy web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or JavaScript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a web page. The NCC POP 142 may thus process the web page together with all embedded content based on the selected remote browsing session protocol, and utilize the remote browsing session protocol to exchange user interaction data and updated browse session data for all embedded content associated with the web page. In another embodiment, the NCC POP 142 may select different remote session browsing configurations for one or more resources in a set of network content. For example, a network resource such as a web page may reference processing intensive embedded JavaScript or CSS resources, as well as embedded video resources. The NCC POP 142 may select a first remote session browsing configuration for the web page and all embedded resources excluding the embedded video resource, and a second remote session browsing configuration for the embedded video resource. Illustratively, this may result in the NCC POP 142 utilizing RDP to send a processing result to the client computing device 102 for display of the web page and associated embedded resources, while utilizing HTTP to send the embedded video as a separate, unprocessed file. In one embodiment, the client computing device 102 may perform the minimal processing required to display the RDP processing result corresponding to the web page and embedded resources, and may also perform additional processing necessary to display the embedded video, for example, overlaying the video on top of the displayed RDP representation of the web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIG. 5A, and in FIG. 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a web page corresponding to a processing result from the NCC POP 142 (e.g., RDP display information representing the rendered page) until the browser is finished processing and rendering the web page locally. The browser may then replace the representation from the NCC POP 142 with the locally rendered representation of the web page. Illustratively, replacing one representation with another representation may be transparent to the user. For example, the local and NCC POP 142 representations of the web page may be identical or substantially identical. In one embodiment, when the NCC POP 142 representation of the web page is displayed, the browser may send various user interactions with the displayed page to the NCC POP 142 for processing. When the locally rendered version of the web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
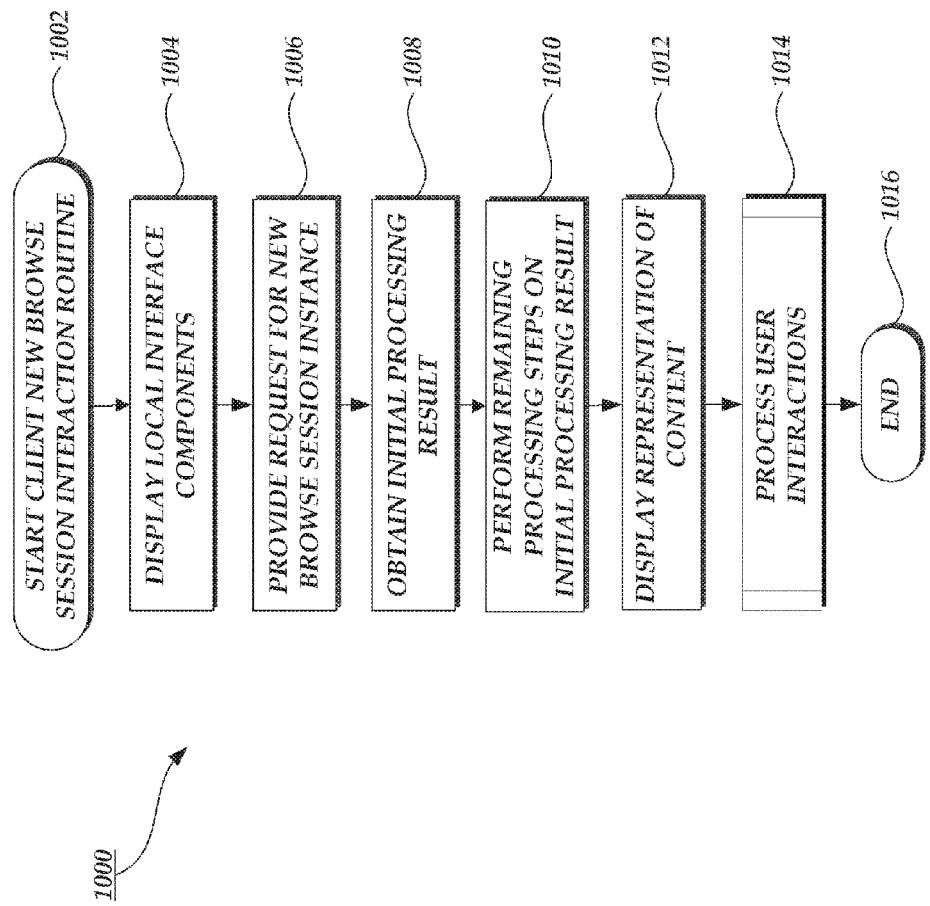
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5A and 7A, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7A above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a web page and associated content for display via RDP in a browser instance running in a virtual machine instance at the NCC POP 142. The browser instance may have one or more interface elements such as toolbars, menus, scroll bars, etc., in addition to the displayed web page. The NCC POP 142 may send an RDP processing result corresponding to the displayed web page only, without any of the interface elements associated with the browser. Illustratively, including an RDP processing result corresponding to the displayed web page only may allow the browser at the client computing instance 102 to display the web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
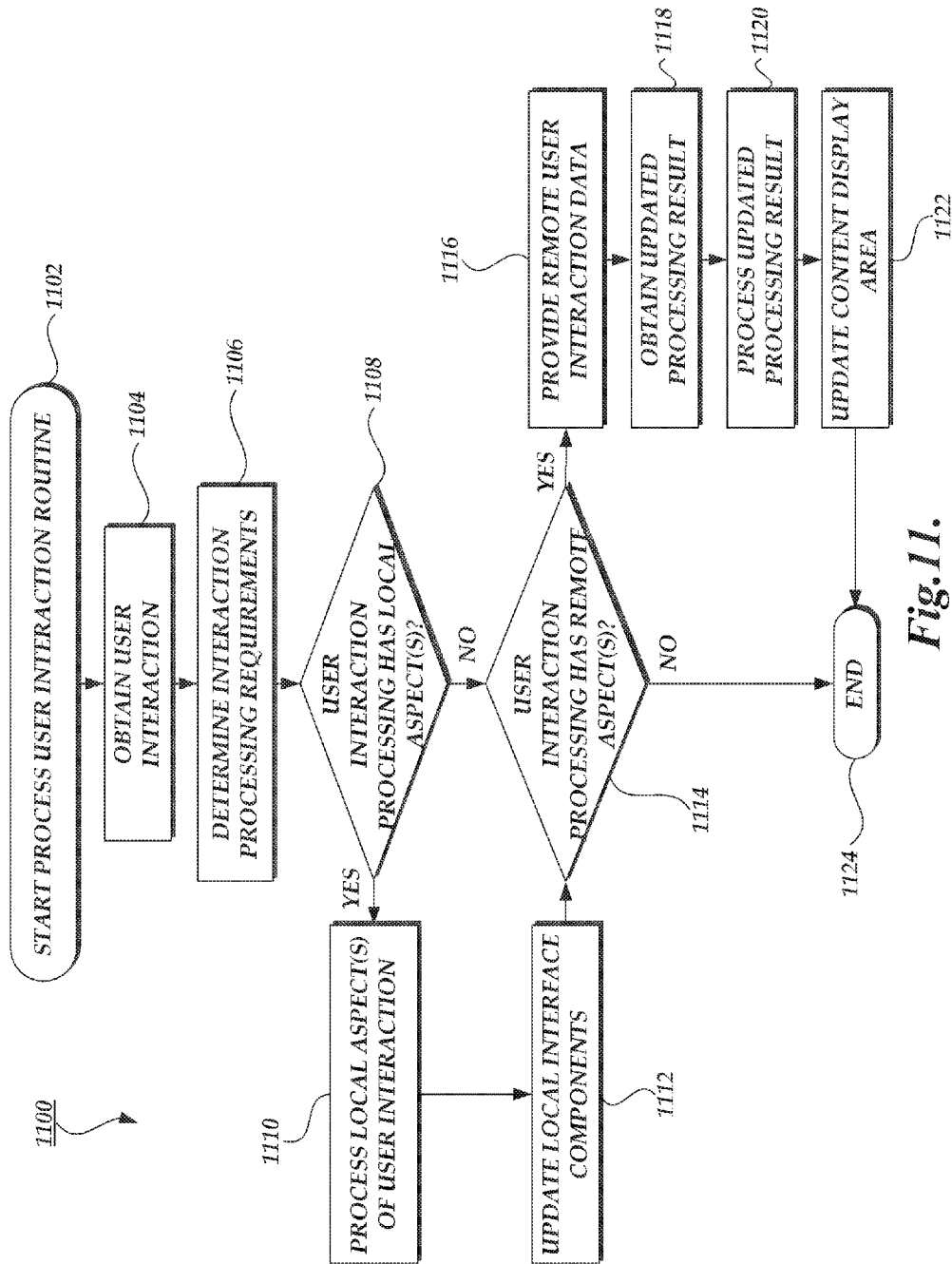
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a web page may require processing and may change the configuration or visual appearance of the web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7A. For example, some local interface components may be managed locally by browser code running on the client computing device, while other local interface components may have one or more locally managed aspects (e.g., button click feedback, scroll bar redraw, etc.), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7A and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7A and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for prioritized transmission of network resources, the system comprising:
    a network computing component comprising one or more server computing devices, wherein server computing devices of the one or more server computing devices include a processor and memory and executing computer-readable instructions;
    the network computing component comprising an instantiated browser application in communication, over a network connection, with a browser application of a client computing device, wherein the network computing component is operable to:
    receive, from the client computing device, a request for a network resource hosted by a content provider, wherein the network resource comprises a first embedded resource and a second embedded resource;
    identify processing of the first and second embedded resources, wherein the first embedded resource is determined to be processed in the browser application of the client computing device, and wherein the second embedded resource is determined to be processed, at least in part, in the instantiated browser application;
    process, in the instantiated browser application, at least a part of the second embedded resource to obtain a browser processing result of the second embedded resource prior to rendering on the browser application of the client computing device;
    obtain prioritization rules for transmitting the first embedded resource and the browser processing result of the second embedded resource to the browser application of the client computing device, wherein the prioritization rules specify priorities at which the first embedded resource and the browser processing result should be transmitted to the client computing device; and
    transmit, over the network connection, the first embedded resource and the browser processing result of the second embedded resource to the browser application of the client computing device according to the prioritization rules.

2. The system of claim 1, wherein the prioritization rules specify a higher priority for transmitting the first embedded resource than for transmitting the browser processing result of the second embedded resource.

3. The system of claim 2, wherein the network computing component obtains the browser processing result of the second embedded resource and transmits at least a portion of the first embedded resource substantially simultaneously.

4. The system of claim 1, wherein the prioritization rules further specify relative priorities at which the browser processing result of the second embedded resource and the second embedded resource should be transmitted to the client computing device.

5. The system of claim 4, wherein the network computing component is further operable to transmit, over the network connection, the second embedded resource to the browser application of the client computing device according to the prioritization rules.

6. The system of claim 1, wherein the relative priorities are based at least in part on an analysis of historical processing measurements of the browser application of the client computing device.

7. The system of claim 1, wherein the prioritization rules further specify a bandwidth for transmitting the first embedded resource, and wherein the network computing component operable to transmit the first embedded resource and the browser processing result of the second embedded resource according to the prioritization rules is operable to:
    determine that an available bandwidth of the network connection comprises the specified bandwidth and an excess bandwidth;
    transmit, over the network connection, the first embedded resource to the browser application of the client computing device using the specified bandwidth; and
    transmit, over the network connection, the browser processing result to the browser application of the client computing device using the excess bandwidth,
    wherein the first embedded resource and at least a portion of the browser processing result are transmitted substantially simultaneously.

8. A computer-implemented method for prioritized transmission of network content, the computer-implemented method under control of computing hardware executing specific instructions, the computer-implemented method comprising:
    receiving, by a network computing component, a request for network content from a client computing device, the network content comprising a plurality of content objects, wherein the network computing component comprises an instantiated browser application in communication, over a network connection, with a browser application of the client computing device;
    obtaining, by the instantiated browser application of the network computing component, the plurality of content objects;
    processing, by the instantiated browser application of the network computing component, at least one content object of the plurality of content objects to generate a browser processing result of the at least one content object prior to rendering on the browser application of the client computing device, wherein the processing is based on a determination that the at least one content object is to be processed in the instantiated browser application of the network computing component and a first portion of the plurality of content objects is to be processed in the browser application of the client computing device;

obtaining, by the instantiated browser application of the network computing component, prioritization rules for transmitting the plurality of content objects and the browser processing result of the at least one content object to the browser application of the client computing device;

determining, by the instantiated browser application of the network computing component, a prioritization for transmitting the plurality of content objects and the browser processing result of the at least one content object in accordance with the prioritization rules; and transmitting, by the instantiated browser application of the network computing component, at least the first portion of the plurality of content objects and the browser processing result of the at least one content object to the browser application of the client computing device according to the prioritization.

9. The computer-implemented method of claim 8 further comprising:

obtaining, by the network computing component, interaction data from the client computing device;

determining, by the network computing component, an updated prioritization for transmitting the plurality of content objects based at least in part on the prioritization rules and the interaction data; and transmitting, by the network computing component, at least a second portion of the plurality of content objects and the browser processing result of the at least one content object to the browser application of the client computing device in accordance with the updated prioritization.

10. The computer-implemented method of claim 9, wherein the interaction data is indicative of interaction with the browser processing result of the at least one content object.

11. The computer-implemented method of claim 10, wherein the updated prioritization specifies an updated priority for transmission of the at least one content object.

12. The computer-implemented method of claim 8, wherein the prioritization rules identify at least a first set of content objects and a second set of content objects within the plurality of content objects, and wherein the prioritization rules specify relative prioritizations of the first set of content objects and the second set of content objects.

13. The computer-implemented method of claim 12, wherein the prioritization specifies transmitting the first set of content objects prior to the second set of content objects.

14. The computer-implemented method of claim 12, wherein the second set of content objects includes the at least one content object.

15. The computer-implemented method of claim 14 further comprising:

obtaining, by the network computing component, interaction data from the client computing device;

determining, by the network computing component, that the interaction data is indicative of interaction with the browser processing result of the at least one content object;

removing the at least one content object from the second set of content objects; and adding the at least one content object to the first set of content objects.

16. A system for prioritizing transmission of network resources to a client computing device, the system comprising:

a data store configured to store embedded resources; and a network computing component comprising one or more server computing devices, the network computing component comprising an instantiated browser application in communication with a browser application of a client computing device, wherein the network computing component is operable to:

receive a request, from the client computing device, for a network resource hosted by a content provider, wherein the network resource comprises a plurality of embedded resources;

determine that a first embedded resource within the plurality of embedded resources is to be processed, at least in part, in the instantiated browser application of the network computing component and a second embedded resource within the plurality of embedded resources is to be processed in the browser application of the client computing device;

process the first embedded resource in the instantiated browser application to generate a browser processing result of the first embedded resource for prior to rendering on the browser application of the client computing device;

obtain prioritization rules for transmitting the second embedded and the browser processing result of the first embedded resource to the browser application of the client computing device, wherein the prioritization rules are based at least in part on previously transmitted embedded resources; and transmit the second embedded resources and the browser processing result of the first embedded resource to the browser application of the client computing device according to the prioritization rules.

17. The system of claim 16, wherein the previously transmitted embedded resources include at least one embedded resource of the plurality of embedded resources.

18. The system of claim 16, wherein the data store is further configured to store at least one of prioritization rules and performance metrics.

19. The system of claim 18, wherein the network computing component is further operable to:

obtain, from the client computing device, performance metrics associated with at least one embedded resource within the plurality of embedded resources; and store the at least one embedded resource and the associated performance metrics in the data store.

20. The system of claim 18, wherein the network computing component is further operable to:

determine a prioritization rule for transmitting the at least one embedded resource; and store the prioritization rule in the data store.

* * * * *

UNITED STATES PATENT AND TRADEMARK OFFICE
CERTIFICATE OF CORRECTION

PATENT NO. : 9,723,067 B2
APPLICATION NO. : 15/048817
DATED : August 1, 2017
INVENTOR(S) : Andrew Lynch Hayden Page 1 of 1

It is certified that error appears in the above-identified patent and that said Letters Patent is hereby corrected as shown below:

In the Claims

In Column 40 at Line 40 (approx.), In Claim 16, change "resources" to --resource--.

Signed and Sealed this
Twenty-fourth Day of April, 2018

Andrei Iancu
*Director of the United States Patent and Trademark Office*